(12) United States Patent
Krikorian et al.

(10) Patent No.: US 8,799,969 B2
(45) Date of Patent: *Aug. 5, 2014

(54) CAPTURING AND SHARING MEDIA CONTENT

(75) Inventors: Jason Gary Krikorian, Woodside, CA (US); Blake Gary Krikorian, Hillsborough, CA (US)

(73) Assignee: Sling Media, Inc., Foster City, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 13/107,341

(22) Filed: May 13, 2011

(65) Prior Publication Data

US 2011/0219413 A1    Sep. 8, 2011

Related U.S. Application Data

(63) Continuation of application No. 11/620,707, filed on Jan. 7, 2007, now Pat. No. 7,975,062, which is a continuation-in-part of application No. 11/147,664, filed on Jun. 7, 2005, now Pat. No. 7,877,776.

(60) Provisional application No. 60/823,066, filed on Aug. 21, 2006, provisional application No. 60/577,833, filed on Jun. 7, 2004.

(51) Int. Cl.
*H04N 7/173* (2011.01)

(52) U.S. Cl.
USPC .................. 725/93; 725/94; 725/95; 725/115

(58) Field of Classification Search
USPC .................. 725/89, 93–95, 109, 115–116
See application file for complete search history.

(56) References Cited

U.S. PATENT DOCUMENTS

| | | | |
|---|---|---|---|
| 3,416,043 A | 12/1968 | Jorgensen | |
| 4,254,303 A | 3/1981 | Takizawa | |
| 5,132,992 A | 7/1992 | Yurt et al. | |
| 5,161,021 A | 11/1992 | Tsai | |
| 5,237,648 A | 8/1993 | Mills et al. | |
| 5,293,357 A * | 3/1994 | Hallenbeck | 725/39 |
| 5,321,846 A | 6/1994 | Yokota et al. | |

(Continued)

FOREIGN PATENT DOCUMENTS

| | | |
|---|---|---|
| CA | 2286641 A1 | 10/1998 |
| CA | 2324856 A1 | 5/2001 |

(Continued)

OTHER PUBLICATIONS

ReplayTV 5000 user's guide, 2002, entire document.*

(Continued)

*Primary Examiner* — Hunter B Lonsberry
(74) *Attorney, Agent, or Firm* — Ingrassia Fisher & Lorenz, P.C.

(57) ABSTRACT

A media device allows users to watch and capture portions from a media stream. Users may then share the captured media content with other users. In one embodiment, the media device receives a media stream, plays the media stream, and caches a portion of the media stream as it is being played. A user can define a media clip by selecting its boundaries in the cached portion of the media stream. The media device creates the media clip based on the user's input and enables the user to transmit the media clip to another system, such as a community website for sharing it with other users.

19 Claims, 6 Drawing Sheets

(56) References Cited

U.S. PATENT DOCUMENTS

| | | | |
|---|---|---|---|
| 5,386,493 A | 1/1995 | Degen et al. | |
| 5,434,590 A | 7/1995 | Dinwiddie, Jr. et al. | |
| 5,493,638 A | 2/1996 | Hooper et al. | |
| 5,537,530 A * | 7/1996 | Edgar et al. | 715/723 |
| 5,602,589 A | 2/1997 | Vishwanath et al. | |
| 5,661,516 A | 8/1997 | Carles | |
| 5,666,426 A | 9/1997 | Helms | |
| 5,682,195 A | 10/1997 | Hendricks et al. | |
| 5,706,290 A | 1/1998 | Shaw et al. | |
| 5,708,961 A | 1/1998 | Hylton et al. | |
| 5,710,605 A | 1/1998 | Nelson | |
| 5,722,041 A | 2/1998 | Freadman | |
| 5,757,416 A | 5/1998 | Birch et al. | |
| 5,774,170 A | 6/1998 | Hite et al. | |
| 5,778,077 A | 7/1998 | Davidson | |
| 5,794,116 A | 8/1998 | Matsuda et al. | |
| 5,822,537 A | 10/1998 | Katseff et al. | |
| 5,831,664 A | 11/1998 | Wharton et al. | |
| 5,850,482 A | 12/1998 | Meany et al. | |
| 5,852,437 A | 12/1998 | Wugofski et al. | |
| 5,880,721 A | 3/1999 | Yen | |
| 5,889,506 A | 3/1999 | Lopresti et al. | |
| 5,898,679 A | 4/1999 | Brederveld et al. | |
| 5,909,518 A | 6/1999 | Chui | |
| 5,911,582 A | 6/1999 | Redford et al. | |
| 5,922,072 A | 7/1999 | Hutchinson et al. | |
| 5,936,968 A | 8/1999 | Lyons | |
| 5,968,132 A | 10/1999 | Tokunaga | |
| 5,969,764 A | 10/1999 | Sun et al. | |
| 5,987,501 A | 11/1999 | Hamilton et al. | |
| 6,002,450 A | 12/1999 | Darbee et al. | |
| 6,008,777 A | 12/1999 | Yiu | |
| 6,014,694 A | 1/2000 | Aharoni et al. | |
| 6,020,880 A | 2/2000 | Naimpally | |
| 6,023,233 A | 2/2000 | Craven et al. | |
| 6,031,940 A | 2/2000 | Chui et al. | |
| 6,036,601 A | 3/2000 | Heckel | |
| 6,040,829 A | 3/2000 | Croy et al. | |
| 6,043,837 A | 3/2000 | Driscoll, Jr. et al. | |
| 6,044,396 A | 3/2000 | Adams | |
| 6,049,671 A | 4/2000 | Slivka et al. | |
| 6,075,906 A | 6/2000 | Fenwick et al. | |
| 6,088,777 A | 7/2000 | Sorber | |
| 6,097,441 A | 8/2000 | Allport | |
| 6,104,334 A | 8/2000 | Allport | |
| 6,108,041 A | 8/2000 | Faroudja et al. | |
| 6,115,420 A | 9/2000 | Wang | |
| 6,117,126 A | 9/2000 | Appelbaum et al. | |
| 6,141,059 A | 10/2000 | Boyce et al. | |
| 6,141,447 A | 10/2000 | Linzer et al. | |
| 6,160,544 A | 12/2000 | Hayashi et al. | |
| 6,201,536 B1 | 3/2001 | Hendricks et al. | |
| 6,212,282 B1 | 4/2001 | Mershon | |
| 6,222,885 B1 | 4/2001 | Chaddha et al. | |
| 6,223,211 B1 | 4/2001 | Hamilton et al. | |
| 6,240,459 B1 | 5/2001 | Roberts et al. | |
| 6,240,531 B1 | 5/2001 | Spilo et al. | |
| 6,243,596 B1 | 6/2001 | Kikinis | |
| 6,256,019 B1 | 7/2001 | Allport | |
| 6,263,503 B1 | 7/2001 | Margulis | |
| 6,279,029 B1 | 8/2001 | Sampat et al. | |
| 6,282,714 B1 | 8/2001 | Ghori et al. | |
| 6,286,142 B1 | 9/2001 | Ehreth | |
| 6,289,485 B1 | 9/2001 | Shiomoto | |
| 6,310,886 B1 | 10/2001 | Barton | |
| 6,340,994 B1 | 1/2002 | Margulis et al. | |
| 6,353,885 B1 | 3/2002 | Herzi et al. | |
| 6,356,945 B1 | 3/2002 | Shaw et al. | |
| 6,357,021 B1 | 3/2002 | Kitagawa et al. | |
| 6,370,688 B1 | 4/2002 | Hejna, Jr. | |
| 6,389,467 B1 | 5/2002 | Eyal | |
| 6,421,429 B1 | 7/2002 | Merritt et al. | |
| 6,434,113 B1 | 8/2002 | Gubbi | |
| 6,442,067 B1 | 8/2002 | Chawla et al. | |
| 6,456,340 B1 | 9/2002 | Margulis | |
| 6,466,623 B1 | 10/2002 | Youn et al. | |
| 6,470,378 B1 | 10/2002 | Tracton et al. | |
| 6,476,826 B1 * | 11/2002 | Plotkin et al. | 715/723 |
| 6,487,319 B1 | 11/2002 | Chai | |
| 6,493,874 B2 | 12/2002 | Humpleman | |
| 6,496,122 B2 | 12/2002 | Sampsell | |
| 6,505,169 B1 | 1/2003 | Bhagavath et al. | |
| 6,510,177 B1 | 1/2003 | De Bonet et al. | |
| 6,529,506 B1 | 3/2003 | Yamamoto et al. | |
| 6,553,147 B2 | 4/2003 | Chai et al. | |
| 6,557,031 B1 | 4/2003 | Mimura et al. | |
| 6,564,004 B1 | 5/2003 | Kadono | |
| 6,567,984 B1 | 5/2003 | Allport | |
| 6,584,201 B1 | 6/2003 | Konstantinou et al. | |
| 6,584,559 B1 | 6/2003 | Huh et al. | |
| 6,597,375 B1 * | 7/2003 | Yawitz | 715/723 |
| 6,598,159 B1 | 7/2003 | McAlister et al. | |
| 6,600,838 B2 | 7/2003 | Chui | |
| 6,609,253 B1 | 8/2003 | Swix et al. | |
| 6,611,530 B1 | 8/2003 | Apostolopoulos | |
| 6,628,716 B1 | 9/2003 | Tan et al. | |
| 6,642,939 B1 | 11/2003 | Vallone et al. | |
| 6,647,015 B2 | 11/2003 | Malkemes et al. | |
| 6,658,019 B1 | 12/2003 | Chen et al. | |
| 6,665,751 B1 | 12/2003 | Chen et al. | |
| 6,665,813 B1 | 12/2003 | Forsman et al. | |
| 6,697,356 B1 | 2/2004 | Kretschmer et al. | |
| 6,701,380 B2 | 3/2004 | Schneider et al. | |
| 6,704,678 B2 | 3/2004 | Minke et al. | |
| 6,704,847 B1 | 3/2004 | Six et al. | |
| 6,708,231 B1 | 3/2004 | Kitagawa | |
| 6,718,551 B1 | 4/2004 | Swix et al. | |
| 6,754,266 B2 | 6/2004 | Bahl et al. | |
| 6,754,439 B1 | 6/2004 | Hensley et al. | |
| 6,757,277 B1 | 6/2004 | Shaffer et al. | |
| 6,757,851 B1 | 6/2004 | Park et al. | |
| 6,757,906 B1 | 6/2004 | Look et al. | |
| 6,766,376 B2 | 7/2004 | Price | |
| 6,768,775 B1 | 7/2004 | Wen et al. | |
| 6,771,828 B1 | 8/2004 | Malvar | |
| 6,774,912 B1 | 8/2004 | Ahmed et al. | |
| 6,781,601 B2 | 8/2004 | Cheung | |
| 6,785,700 B2 | 8/2004 | Masud et al. | |
| 6,788,862 B2 | 9/2004 | Greer et al. | |
| 6,795,638 B1 * | 9/2004 | Skelley, Jr. | 386/281 |
| 6,798,838 B1 | 9/2004 | Ngo | |
| 6,806,909 B1 | 10/2004 | Radha et al. | |
| 6,807,308 B2 | 10/2004 | Chui et al. | |
| 6,816,194 B2 | 11/2004 | Zhang et al. | |
| 6,816,858 B1 | 11/2004 | Coden et al. | |
| 6,826,242 B2 | 11/2004 | Ojard et al. | |
| 6,834,123 B2 | 12/2004 | Acharya et al. | |
| 6,839,079 B2 | 1/2005 | Barlow et al. | |
| 6,847,468 B2 | 1/2005 | Ferriere | |
| 6,850,571 B2 | 2/2005 | Tardif | |
| 6,850,649 B1 | 2/2005 | Malvar | |
| 6,868,083 B2 | 3/2005 | Apostolopoulos et al. | |
| 6,889,385 B1 | 5/2005 | Rakib et al. | |
| 6,892,359 B1 | 5/2005 | Nason et al. | |
| 6,898,583 B1 | 5/2005 | Rising, III | |
| 6,907,602 B2 | 6/2005 | Tsai et al. | |
| 6,910,175 B2 | 6/2005 | Krishnamachari | |
| 6,927,685 B2 | 8/2005 | Wathen | |
| 6,930,661 B2 | 8/2005 | Uchida et al. | |
| 6,941,575 B2 | 9/2005 | Allen | |
| 6,944,880 B1 | 9/2005 | Allen | |
| 6,952,595 B2 | 10/2005 | Ikedo et al. | |
| 6,981,050 B1 | 12/2005 | Tobias et al. | |
| 7,016,337 B1 | 3/2006 | Wu et al. | |
| 7,020,892 B2 | 3/2006 | Levesque et al. | |
| 7,032,000 B2 | 4/2006 | Tripp | |
| 7,047,305 B1 | 5/2006 | Brooks et al. | |
| 7,103,905 B2 * | 9/2006 | Novak | 725/46 |
| 7,110,558 B1 | 9/2006 | Elliott | |
| 7,124,366 B2 | 10/2006 | Foreman et al. | |
| 7,127,507 B1 | 10/2006 | Clark et al. | |
| 7,151,575 B1 | 12/2006 | Landry et al. | |
| 7,155,734 B1 | 12/2006 | Shimomura et al. | |
| 7,155,735 B1 | 12/2006 | Ngo et al. | |

(56) References Cited

U.S. PATENT DOCUMENTS

| | | | |
|---|---|---|---|
| 7,184,433 B1 | 2/2007 | Oz | |
| 7,224,323 B2 | 5/2007 | Uchida et al. | |
| 7,239,800 B2 | 7/2007 | Bilbrey | |
| 7,344,084 B2 | 3/2008 | Dacosta | |
| 7,382,729 B2 | 6/2008 | Honda et al. | |
| 7,430,686 B1 | 9/2008 | Wang et al. | |
| 7,464,396 B2 | 12/2008 | Hejna, Jr. | |
| 7,478,164 B1 | 1/2009 | Lango et al. | |
| 7,478,166 B2 | 1/2009 | Agnoli et al. | |
| 7,502,733 B2 | 3/2009 | Andrsen et al. | |
| 7,505,480 B1 | 3/2009 | Zhang et al. | |
| 7,516,136 B2 | 4/2009 | Lee et al. | |
| 7,565,681 B2 | 7/2009 | Ngo et al. | |
| 7,594,218 B1 | 9/2009 | Lozben | |
| 7,616,955 B2 | 11/2009 | Kim | |
| 7,676,590 B2 | 3/2010 | Silverman et al. | |
| 7,676,823 B2 | 3/2010 | Acharya et al. | |
| 7,720,432 B1 | 5/2010 | Colby et al. | |
| 7,721,300 B2 | 5/2010 | Tipton et al. | |
| 7,725,912 B2 | 5/2010 | Margulis | |
| 7,778,372 B2 | 8/2010 | Takashima | |
| 7,788,696 B2 * | 8/2010 | Burges et al. | 725/114 |
| 7,895,275 B1 | 2/2011 | Evans et al. | |
| 7,911,946 B2 | 3/2011 | Poli et al. | |
| 7,913,278 B2 | 3/2011 | Ellis et al. | |
| 7,921,150 B1 | 4/2011 | Schwartz | |
| 7,945,688 B1 | 5/2011 | Lango et al. | |
| 8,051,454 B2 | 11/2011 | Krikorian et al. | |
| 8,060,906 B2 * | 11/2011 | Begeja et al. | 725/46 |
| 8,365,236 B2 | 1/2013 | Krikorian et al. | |
| 2001/0021998 A1 | 9/2001 | Margulis | |
| 2002/0004839 A1 | 1/2002 | Wine et al. | |
| 2002/0010925 A1 | 1/2002 | Kikinis | |
| 2002/0012530 A1 | 1/2002 | Bruls | |
| 2002/0019984 A1 | 2/2002 | Rakib | |
| 2002/0031333 A1 | 3/2002 | Mano et al. | |
| 2002/0032907 A1 | 3/2002 | Daniels | |
| 2002/0046404 A1 | 4/2002 | Mizutani | |
| 2002/0053053 A1 | 5/2002 | Nagai et al. | |
| 2002/0080753 A1 | 6/2002 | Lee | |
| 2002/0090029 A1 | 7/2002 | Kim | |
| 2002/0105529 A1 | 8/2002 | Bowser et al. | |
| 2002/0112247 A1 | 8/2002 | Horner et al. | |
| 2002/0122137 A1 | 9/2002 | Chen et al. | |
| 2002/0131497 A1 | 9/2002 | Jang | |
| 2002/0138843 A1 | 9/2002 | Samaan et al. | |
| 2002/0143972 A1 | 10/2002 | Christopoulos et al. | |
| 2002/0143973 A1 | 10/2002 | Price | |
| 2002/0147634 A1 | 10/2002 | Jacoby et al. | |
| 2002/0147687 A1 | 10/2002 | Breiter et al. | |
| 2002/0151992 A1 | 10/2002 | Hoffberg et al. | |
| 2002/0167458 A1 | 11/2002 | Baudisch et al. | |
| 2002/0188818 A1 | 12/2002 | Nimura et al. | |
| 2002/0191575 A1 | 12/2002 | Kalavade et al. | |
| 2003/0001880 A1 | 1/2003 | Holtz et al. | |
| 2003/0028643 A1 | 2/2003 | Jabri | |
| 2003/0028873 A1 | 2/2003 | Lemmons | |
| 2003/0030752 A1 | 2/2003 | Begeja et al. | |
| 2003/0065915 A1 | 4/2003 | Yu et al. | |
| 2003/0078973 A1 | 4/2003 | Przekop et al. | |
| 2003/0088686 A1 | 5/2003 | Jennings | |
| 2003/0093260 A1 | 5/2003 | Dagtas et al. | |
| 2003/0095791 A1 | 5/2003 | Barton et al. | |
| 2003/0115167 A1 | 6/2003 | Sharif et al. | |
| 2003/0159143 A1 | 8/2003 | Chan | |
| 2003/0187657 A1 | 10/2003 | Erhart et al. | |
| 2003/0192054 A1 | 10/2003 | Birks et al. | |
| 2003/0208612 A1 * | 11/2003 | Harris et al. | 709/231 |
| 2003/0231621 A1 | 12/2003 | Gubbi et al. | |
| 2003/0231868 A1 | 12/2003 | Herley | |
| 2003/0234803 A1 | 12/2003 | Toyama et al. | |
| 2004/0003406 A1 | 1/2004 | Billmaier | |
| 2004/0052216 A1 | 3/2004 | Roh | |
| 2004/0068334 A1 | 4/2004 | Tsai et al. | |
| 2004/0083301 A1 | 4/2004 | Murase et al. | |
| 2004/0098748 A1 | 5/2004 | Bo et al. | |
| 2004/0100486 A1 | 5/2004 | Flamini et al. | |
| 2004/0101271 A1 | 5/2004 | Boston et al. | |
| 2004/0103340 A1 | 5/2004 | Sundareson et al. | |
| 2004/0139047 A1 | 7/2004 | Rechsteiner et al. | |
| 2004/0162845 A1 | 8/2004 | Kim et al. | |
| 2004/0162903 A1 | 8/2004 | Oh | |
| 2004/0172410 A1 | 9/2004 | Shimojima et al. | |
| 2004/0205830 A1 | 10/2004 | Kaneko | |
| 2004/0212640 A1 | 10/2004 | Mann et al. | |
| 2004/0215458 A1 | 10/2004 | Kobayashi et al. | |
| 2004/0216173 A1 | 10/2004 | Horoszowski et al. | |
| 2004/0236844 A1 | 11/2004 | Kocherlakota | |
| 2004/0246936 A1 | 12/2004 | Perlman | |
| 2004/0255249 A1 | 12/2004 | Chang et al. | |
| 2005/0021398 A1 | 1/2005 | McCleskey et al. | |
| 2005/0021830 A1 | 1/2005 | Urzaiz et al. | |
| 2005/0027821 A1 | 2/2005 | Alexander et al. | |
| 2005/0038981 A1 | 2/2005 | Connor et al. | |
| 2005/0044058 A1 | 2/2005 | Matthews et al. | |
| 2005/0050462 A1 | 3/2005 | Whittle et al. | |
| 2005/0053356 A1 | 3/2005 | Mate et al. | |
| 2005/0055595 A1 | 3/2005 | Frazer et al. | |
| 2005/0060759 A1 | 3/2005 | Rowe et al. | |
| 2005/0097542 A1 | 5/2005 | Lee | |
| 2005/0114852 A1 | 5/2005 | Chen et al. | |
| 2005/0132351 A1 | 6/2005 | Randall et al. | |
| 2005/0138560 A1 | 6/2005 | Lee et al. | |
| 2005/0172028 A1 | 8/2005 | Nilsson et al. | |
| 2005/0198584 A1 | 9/2005 | Matthews et al. | |
| 2005/0204046 A1 | 9/2005 | Watanabe | |
| 2005/0216851 A1 | 9/2005 | Hull et al. | |
| 2005/0223087 A1 | 10/2005 | Van Der Stok | |
| 2005/0227621 A1 | 10/2005 | Katoh | |
| 2005/0229118 A1 | 10/2005 | Chiu et al. | |
| 2005/0246369 A1 | 11/2005 | Oreizy et al. | |
| 2005/0246451 A1 | 11/2005 | Silverman et al. | |
| 2005/0251833 A1 | 11/2005 | Schedivy | |
| 2005/0262534 A1 | 11/2005 | Bontempi et al. | |
| 2005/0283791 A1 | 12/2005 | McCarthy et al. | |
| 2005/0288999 A1 | 12/2005 | Lerner et al. | |
| 2006/0011371 A1 | 1/2006 | Fahey | |
| 2006/0031381 A1 | 2/2006 | Van Luijt et al. | |
| 2006/0050970 A1 | 3/2006 | Gunatilake | |
| 2006/0051055 A1 | 3/2006 | Ohkawa | |
| 2006/0095401 A1 | 5/2006 | Krikorian et al. | |
| 2006/0095471 A1 | 5/2006 | Krikorian et al. | |
| 2006/0095472 A1 | 5/2006 | Krikorian et al. | |
| 2006/0095942 A1 | 5/2006 | Van Beek | |
| 2006/0095943 A1 | 5/2006 | Demircin et al. | |
| 2006/0101499 A1 | 5/2006 | Aravamudan et al. | |
| 2006/0107226 A1 | 5/2006 | Matthews et al. | |
| 2006/0117371 A1 | 6/2006 | Margulis | |
| 2006/0146174 A1 | 7/2006 | Hagino | |
| 2006/0156219 A1 | 7/2006 | Haot et al. | |
| 2006/0171395 A1 | 8/2006 | Deshpande | |
| 2006/0174026 A1 | 8/2006 | Robinson et al. | |
| 2006/0184980 A1 | 8/2006 | Cole | |
| 2006/0190616 A1 | 8/2006 | Mayerhofer et al. | |
| 2006/0206526 A1 | 9/2006 | Sitomer | |
| 2006/0206581 A1 | 9/2006 | Howarth et al. | |
| 2006/0230345 A1 | 10/2006 | Weng et al. | |
| 2006/0265384 A1 | 11/2006 | Lee et al. | |
| 2006/0280157 A1 | 12/2006 | Karaoguz et al. | |
| 2006/0280177 A1 | 12/2006 | Gupta et al. | |
| 2006/0294183 A1 | 12/2006 | Agnoli et al. | |
| 2007/0003224 A1 | 1/2007 | Krikorian et al. | |
| 2007/0005783 A1 | 1/2007 | Saint-Hillaire et al. | |
| 2007/0022328 A1 | 1/2007 | Tarra et al. | |
| 2007/0043792 A1 | 2/2007 | O'Brien | |
| 2007/0053446 A1 | 3/2007 | Spilo | |
| 2007/0061783 A1 | 3/2007 | Prakash | |
| 2007/0067390 A1 | 3/2007 | Agnoli et al. | |
| 2007/0073767 A1 | 3/2007 | Springer, Jr. et al. | |
| 2007/0074115 A1 | 3/2007 | Patten et al. | |
| 2007/0076604 A1 | 4/2007 | Litwack | |
| 2007/0097257 A1 | 5/2007 | El-Maleh et al. | |
| 2007/0127437 A1 | 6/2007 | Ozawa | |
| 2007/0136778 A1 | 6/2007 | Birger et al. | |

(56) References Cited

U.S. PATENT DOCUMENTS

| | | |
|---|---|---|
| 2007/0168543 A1 | 7/2007 | Krikorian et al. |
| 2007/0180485 A1 | 8/2007 | Dua |
| 2007/0198532 A1 | 8/2007 | Krikorian et al. |
| 2007/0234213 A1 | 10/2007 | Krikorian et al. |
| 2007/0260462 A1 | 11/2007 | Andrsen et al. |
| 2007/0274327 A1 | 11/2007 | Kaarela et al. |
| 2007/0286596 A1 | 12/2007 | Lonn |
| 2007/0290876 A1 | 12/2007 | Sato et al. |
| 2008/0007651 A1 | 1/2008 | Bennett |
| 2008/0019276 A1 | 1/2008 | Takatsuji et al. |
| 2008/0037573 A1 | 2/2008 | Cohen |
| 2008/0059533 A1 | 3/2008 | Krikorian |
| 2008/0134267 A1 | 6/2008 | Moghe et al. |
| 2008/0195698 A1 | 8/2008 | Stefanovic et al. |
| 2008/0195744 A1 | 8/2008 | Bowra et al. |
| 2008/0199150 A1 | 8/2008 | Candelore |
| 2008/0215392 A1 | 9/2008 | Rajan |
| 2008/0256485 A1 | 10/2008 | Krikorian |
| 2008/0294759 A1 | 11/2008 | Biswas et al. |
| 2008/0307456 A1 | 12/2008 | Beetcher et al. |
| 2008/0307462 A1 | 12/2008 | Beetcher et al. |
| 2008/0307463 A1 | 12/2008 | Beetcher et al. |
| 2009/0074380 A1 | 3/2009 | Boston et al. |
| 2009/0080448 A1 | 3/2009 | Tarra et al. |
| 2009/0102983 A1 | 4/2009 | Malone et al. |
| 2009/0103607 A1 | 4/2009 | Bajpai et al. |
| 2009/0157697 A1 | 6/2009 | Conway et al. |
| 2009/0157777 A1 | 6/2009 | Golwalkar et al. |
| 2009/0177758 A1 | 7/2009 | Banger et al. |
| 2009/0199248 A1 | 8/2009 | Ngo et al. |
| 2009/0252219 A1 | 10/2009 | Chen et al. |
| 2009/0254672 A1 | 10/2009 | Zhang |
| 2009/0268740 A1 | 10/2009 | Sindhu et al. |
| 2009/0300205 A1 | 12/2009 | Jabri |
| 2010/0001960 A1 | 1/2010 | Williams |
| 2010/0005483 A1 | 1/2010 | Rao |
| 2010/0023642 A1 | 1/2010 | Ladd et al. |
| 2010/0064055 A1 | 3/2010 | Krikorian et al. |
| 2010/0064332 A1 | 3/2010 | Krikorian et al. |
| 2010/0070925 A1 | 3/2010 | Einaudi et al. |
| 2010/0071076 A1 | 3/2010 | Gangotri et al. |
| 2010/0100915 A1 | 4/2010 | Krikorian et al. |
| 2010/0129057 A1 | 5/2010 | Kulkarni |
| 2010/0146527 A1 | 6/2010 | Craib et al. |
| 2010/0169477 A1 | 7/2010 | Stienhans et al. |
| 2010/0192007 A1 | 7/2010 | Tarra et al. |
| 2010/0192186 A1 | 7/2010 | Margulis |
| 2010/0192188 A1 | 7/2010 | Rao |
| 2010/0226444 A1 | 9/2010 | Thevathasan et al. |
| 2010/0232437 A1 | 9/2010 | Bajpal et al. |
| 2010/0232438 A1 | 9/2010 | Bajpai et al. |
| 2010/0232439 A1 | 9/2010 | Asnis et al. |
| 2010/0268832 A1 | 10/2010 | Lucas et al. |
| 2010/0269144 A1 | 10/2010 | Forsman et al. |
| 2010/0281042 A1 | 11/2010 | Windes et al. |
| 2010/0309916 A1 | 12/2010 | Oskouy et al. |
| 2011/0002381 A1 | 1/2011 | Yang et al. |
| 2011/0019839 A1 | 1/2011 | Nandury |
| 2011/0032986 A1 | 2/2011 | Banger et al. |
| 2011/0033168 A1 | 2/2011 | Iyer |
| 2011/0035462 A1 | 2/2011 | Akela |
| 2011/0035466 A1 | 2/2011 | Panigrahi |
| 2011/0035467 A1 | 2/2011 | Thiyagarajan et al. |
| 2011/0035668 A1 | 2/2011 | Thiyagarajan |
| 2011/0035669 A1 | 2/2011 | Shirali et al. |
| 2011/0035741 A1 | 2/2011 | Thiyagarajan |
| 2011/0035765 A1 | 2/2011 | Shirali |
| 2011/0047079 A1 | 2/2011 | Du et al. |
| 2011/0050908 A1 | 3/2011 | Nam |
| 2011/0051016 A1 | 3/2011 | Malode |
| 2011/0055864 A1 | 3/2011 | Shah et al. |
| 2011/0113354 A1 | 5/2011 | Thiyagarajan et al. |
| 2011/0119325 A1 | 5/2011 | Paul et al. |
| 2011/0125861 A1 | 5/2011 | Evans et al. |
| 2011/0150432 A1 | 6/2011 | Paul et al. |
| 2011/0153718 A1 | 6/2011 | Dham et al. |
| 2011/0153845 A1 | 6/2011 | Rao et al. |
| 2011/0158610 A1 | 6/2011 | Paul et al. |
| 2011/0191456 A1 | 8/2011 | Jain |
| 2011/0307608 A1 | 12/2011 | Chang et al. |
| 2012/0166669 A1 | 6/2012 | Price |
| 2012/0219001 A1 | 8/2012 | Sindhu et al. |

FOREIGN PATENT DOCUMENTS

| | | |
|---|---|---|
| CN | 1464685 A | 12/2003 |
| DE | 4407319 A1 | 9/1994 |
| EP | 0515101 A2 | 11/1992 |
| EP | 1443766 A2 | 8/2004 |
| GB | 2307151 A | 5/1997 |
| JP | 11289350 A | 10/1999 |
| JP | 2003046582 A | 2/2003 |
| JP | 2003114845 A | 4/2003 |
| JP | 2003179580 A | 6/2003 |
| JP | 2004007127 A | 1/2004 |
| JP | 2004072686 A | 3/2004 |
| JP | 2005032120 A | 2/2005 |
| KR | 20010211410 A | 8/2001 |
| KR | 19990082855 A | 2/2010 |
| TW | 200703018 A | 1/2007 |
| WO | 9837701 | 8/1998 |
| WO | 0072596 A1 | 11/2000 |
| WO | 0133839 A1 | 5/2001 |
| WO | 0147248 A2 | 6/2001 |
| WO | 0193161 A1 | 12/2001 |
| WO | 02073443 A1 | 9/2002 |
| WO | 03052552 A2 | 6/2003 |
| WO | 2004032511 A1 | 4/2004 |
| WO | 2004045218 A1 | 5/2004 |
| WO | 2008024723 A1 | 2/2008 |

OTHER PUBLICATIONS

Japan Patent Office "Hearing" mailed Apr. 24, 2012 for Japanese Patent Appln. No. 2007-527683.

Japan Patent Office "Hearing" mailed Apr. 24, 2012 for Japanese Patent Appln. No. 2007-268269.

European Patent Office "Office Action" dated Aug. 7, 2012 for European Patent Appln. No. 06 734 554.6.

China Patent Office "Office Action" issued Aug. 3, 2012 for Chinese Patent Appln. No. 200810161874.X.

USPTO "Notice of Allowance" mailed Aug. 31, 2012 for U.S. Appl. No. 11/620,711, filed Jan. 7, 2007.

M2 Presswire, Aug. 16, 2006, OTCPicks.com; Daily Market Movers Digest Midday Stock Alerts for Wednesday, Aug. 16th, AMRU, IPTM, BCLC, IHDR, EGIL © 1994-2006 M2 Communications LTD.

USPTO "Notice of Allowance" mailed Jun. 12, 2012 for U.S. Appl. No. 13/240,932, filed Sep. 22, 2011.

USPTO "Final Office Action" mailed Jun. 6, 2012 for U.S. Appl. No. 12/827,964, filed Jun. 20, 2010.

USPTO "Notice of Allowance" mailed Jul. 6, 2012 for U.S. Appl. No. 11/111,265, filed Apr. 21, 2005.

USPTO "Non-Final Office Action" mailed Oct. 23, 2012 for U.S. Appl. No. 13/194,783, filed Jul. 29, 2011.

USPTO "Non-Final Office Action" mailed Sep. 14, 2012 for U.S. Appl. No. 12/635,138, filed Dec. 12, 2009.

USPTO "Notice of Allowance", mailed Oct. 18, 2011; U.S. Appl. No. 12/339,878, filed Dec. 19, 2008.

China State Intellectual Property Office, Decision of Rejection:, Issued Sep. 15, 2011; Chine Patent Appln. No. 200780030811.4.

Canadian Intellectual Property Office, "Office Action" mailed Nov. 28, 2011; Canadian Appln. No. 2,606,235.

China State Intellectual Property Office "Third Office Action" issued Dec. 5, 2012 for Chinese Patent Appln. No. 200680022520.6.

European Patent Office "Extgended Search Report" dated Nov. 27, 2011 for European Patent Appln. No. 12187858.1.

USPTO "Notice of Allowance" mailed Sep. 25, 2012 for U.S. Appl. No. 13/240,932, filed Sep. 22, 2011.

(56) References Cited

OTHER PUBLICATIONS

USPTO "Final Office Action" mailed Apr. 27, 2012; U.S Appl. No. 12/347,465, filed Dec. 31, 2008.
USPTO "Non-Final Office Action" mailed Jan. 10, 2012; U.S. Appl. No. 12/827,964, filed Jun. 30, 2010.
Chinese Office Action, dated Dec. 31, 2011, for Chinese Patent Application No. 200810161874.X.
European Office Action, dated Nov. 30, 2011, for European Patent Application No. 06 734 554.6-2223.
International Search Report and Written Opinion, PCT/US2005/020105, Feb. 15, 2007, 6 pages.
International Search Report and Written Opinion for PCT/US2006/04382, mailed Apr. 27, 2007.
Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.
Faucon, B. "TV 'Brick' Opens up Copyright Can of Worms,"Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01&pagetype+printer§ion+1053801318705&path+articles/2003/06/30/0156825330084.html].
Balster, Eric J., "Video Compression and Rate Control Methods Based on the Wavelet Transform," The Ohio State University 2004, pp. 1-24.
Kulapala et al., "Comparison of Traffic and Quality Characteristics of Rate-Controlled Wavelet and DCT Video," Arizona State University, Oct. 11, 2004.
Skodras et al., "JPEG2000: The Upcoming Still Image Compression Standard," May 11, 2000, 14 pages.
Taubman et al., "Embedded Block Coding in JPEG2000," Feb. 23, 2001, pp. 1-8 of 36.
Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.
Roe, Kevin, "Third-Party Observation Under EPC Article 115 on the Patentability of an Invention," Dec. 21, 2007.
Roe, Kevin, Third-Party Submission for Published Application Under CFR §1.99, Mar. 26, 2008.
International Search Report for International Application No. PCT/US2007/063599, mailed Dec. 12, 2007.
International Search Report for International Application No. PCT/US2007/076337, mailed Oct. 20, 2008.
International Search Report and Written Opinion for International Application No. PCT/US2006/025911, mailed Jan. 3, 2007.
European Patent Office "European Search Report," mailed May 7, 2010 for Application No. 06786174.0.
China State Intellectual Property Office "Office Action," issued Apr. 13, 2010; Application No. 200580026825.X.
Canadian Intellectual Property Office "Office Action" mailed Feb. 18, 2010 for Application No. 2569610.
China State Intellectual Property Office "Office Action" issued Mar. 18, 2010, for Application No. 200680022520.6.
China Patent Office "Office Action" mailed Feb. 23, 2011; Chinese Patent Appln. No. 200680022520.6.
China Patent Office "Office Action" mailed Jan. 6, 2911; Chinese Patent Appln. No. 200810126554.0.
Japan Patent Office "Notice of Grounds for Rejection (Office Action)" mailed Jun. 28, 2011; Japanese Patent Appln. No. P2008-507651.
European Patent Office, European Search Report for European Application No. EP 08 16 7880, mailed Mar. 4, 2009.
Mythtv Wiki, "MythTV User Manual" [Online], Aug. 27, 2007, XP002515046; retrieved from the Internet: <URL: http://www.mythtv.org/wiki?title=User_Manual:Introduction&oldid=25549>.
International Searching Authority, Written Opinion and International Search Report for International Application No. PCT/US2008/077733, mailed Mar. 18, 2009.
International Searching Authority, Written Opinion and International Search Report for International Application No. PCT/US2008/087005, mailed Mar. 20, 2009.
Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.
Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.
Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.
Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [05.2], figures 1,2.
USPTO, Non-Final Office Action mailed Dec. 17, 2004; U.S. Appl. No. 09/809,868, filed Mar. 15, 2001.
USPTO, Final Office Action mailed Jul. 28, 2005; U.S. Appl. No. 09/809,868, filed Mar. 15, 2001.
USPTO, Non-Final Office Action mailed Jan. 30, 2006; U.S. Appl. No. 09/809,868, filed Mar. 15, 2001.
USPTO, Final Office Action mailed Aug. 10, 2006; U.S. Appl. No. 09/809,868, filed Mar. 15, 2001.
USPTO, Non-Final Office Action mailed Jun. 19, 2007; U.S. Appl. No. 09/809,868, filed Mar. 15, 2001.
USPTO, Non-Final Office Action mailed Apr. 16, 2008; U.S. Appl. No. 09/809,868, filed Mar. 15, 2001.
USPTO, Final Office Action mailed Sep. 18, 2008; U.S. Appl. No. 09/809,868, filed Mar. 15, 2001.
USPTO, Non-Final Office Action mailed Mar. 31, 2009; U.S. Appl. No. 09/809,868, filed Mar. 15, 2001.
USPTO, Non-Final Office Action mailed May 1, 2008; U.S. Appl. No. 11/111,265, filed Apr. 21, 2005.
USPTO, Final Office Action mailed Dec. 29, 2008; U.S. Appl. No. 11/111,265, filed Apr. 21, 2005.
USPTO, Non-Final Office Action mailed Jun. 8, 2009; U.S. Appl. No. 11/111,265, filed Apr. 21, 2005.
USPTO, Non-Final Office Action mailed Jun. 26, 2008; U.S. Appl. No. 11/620,707, filed Jan. 7, 2007.
USPTO, Final Office Action mailed Oct. 21, 2008; U.S. Appl. No. 11/620,707, filed Jan. 7, 2007.
USPTO, Non-Final Office Action mailed Mar. 25, 2009; U.S. Appl. No. 11/620,707, filed Jan. 7, 2007.
USPTO, Non-Final Office Action mailed Aug. 7, 2008; U.S. Appl. No. 11/620,711, filed Jan. 7, 2007.
USPTO, Final Office Action mailed Feb. 9, 2009; U.S. Appl. No. 11/620,711, filed Jan. 7, 2007.
USPTO, Non-Final Office Action mailed Feb. 25, 2009; U.S. Appl. No. 11/683,862, filed Mar. 8, 2007.
USPTO, Non-Final Office Action mailed Dec. 24, 2008; U.S. Appl. No. 11/147,985, filed Jun. 7, 2005.
USPTO, Non-Final Office Action mailed Jun. 25, 2008; U.S. Appl. No. 11/428,254, filed Jun. 30, 2006.
USPTO, Final Office Action mailed Feb. 6, 2009; U.S. Appl. No. 11/428,254, filed Jun. 30, 2006.
USPTO, Non-Final Office Action mailed May 15, 2009; U.S. Appl. No. 11/147,664, filed Jun. 7, 2005.
Sonic Blue "ReplayTV 5000 User's Guide," 2002, entire document.
Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.
Microsoft Corporation; Harman/Kardon "Master Your Universe" 1999.

(56) References Cited

OTHER PUBLICATIONS

Matsushita Electric Corporation of America MicroCast: Wireless PC Multimedia Transceiver System, Nov. 1998.
"Wireless Local Area Networks: Issues in Technology and Standards" Jan. 6, 1999.
USPTO, Final Office Action mailed Jun. 25, 2009; U.S. Appl. No. 11/147,985, filed Jun. 7, 2005.
International Search Report and Written Opinion for International Application No. PCT/US2006/025912, mailed Jul. 17, 2008.
International Search Report for International Application No. PCT/US2008/059613, mailed Jul. 21, 2008.
International Search Report and Written Opinion for International Application No. PCT/US2008/080910, mailed Feb. 16, 2009.
Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.
Wikipedia "LocationFree Player" [Online], Sep. 22, 2007, XP002512400; retrieved from the Internet: <URL: http://en.wikipedia.org/w/index.php?title=LocationFree_Player&oldid=159683564>; retrieved on Jan. 28, 2009.
Capable Networks LLC "Keyspan Remote Control—Controlling Your Computer With a Remote" [Online], Feb. 21, 2006, XP002512495; retrieved from the Internet: <URL:http://www.slingcommunity.com/article/11791/Keyspan-Remote-Control---Controlling-Your-Computer-With-a-Remote/?highlight=remote+control>; retrieved on Jan. 28, 2009.
Sling Media Inc. "Slingbox User Guide" [Online] 2006, XP002512553; retrieved from the Internet: <URL:http://www.slingmedia.hk/attach/en-US_Slingbox_User_Guide_v12.pdf>; retrieved on Jan. 29, 2009.
Sony Corporation "LocationFree TV" [Online], 2004, SP002512410; retrieved from the Internet: <URL:http://www.docs.sony.com/release/LFX1_X5revision.pdf>; retrieved on Jan. 28, 2009 [note—document uploaded in two parts as file exceeds the 25MB size limit].
Sony Corporation "LocationFree Player Pak—LocationFree Base Station—LocationFree Player" [Online] 2005, XP002512401; retrieved from the Internet: <URL:http://www.docs.sony.com/release/LFPK1.pdf>; retrieved on Jan. 28, 2009.
USPTO Final Office Action mailed Mar. 3, 2010; U.S. Appl. No. 11/111,265, filed Apr. 21, 2005.
USPTO Final Office Action mailed Mar. 12, 2010; U.S. Appl. No. 11/620,711, filed Jan. 7, 2007.
USPTO Non-Final Office Action mailed Mar. 19, 2010; U.S. Appl. No. 11/147,664, filed Jun. 7, 2005.
USPTO Non-Final Office Action mailed Mar. 31, 2010; U.S. Appl. No. 11/620,707, filed Jan. 7, 2007.
USPTO Non-Final Office Action mailed Apr. 1, 2010; U.S. Appl. No. 12/237,103, filed Sep. 24, 2008.
European Patent Office, International Searching Authority, "International Search Report," mailed Mar. 30, 2010; International Application PCT/US2009/068468 filed Dec. 27, 2009.
USPTO "Non-Final Office Action" mailed Sep. 16, 2011; U.S. Appl. No. 11/111,265, filed Apr. 21, 2005.
USPTO "Non-Final Office Action" mailed Sep. 6, 2011; U.S. Appl. No. 12/347,465, filed Dec. 31, 2008.
USPTO "Notice of Allowance" mailed Sep. 22, 2011; U.S. Appl. No. 12/979,145, filed Dec. 27, 2010.
China State Intellectual Property Office "First Office Action," issued Jul. 31, 2009, for Application No. 200580026825.X.
USPTO, Non-Final Office Action, mailed Aug. 4, 2009; U.S. Appl. No. 11/734,277, filed Apr. 12, 2007.
USPTO, Non-Final Office Action, mailed Jul. 31, 2009; U.S. Appl. No. 11/683,862, filed Mar. 8, 2007.
USPTO, Non-Final Office Action, mailed Aug. 5, 2009; U.S. Appl. No. 11/147,663, filed Jun. 7, 2005.
USPTO, Non-Final Office Action, mailed Sep. 3, 2009; U.S. Appl. No. 11/620,711, filed Jan. 7, 2007.

European Patent Office, International Searching Authority, "International Search Report," for International Application No. PCT/US2009/049006, mailed Sep. 11, 2009.
Australian Government "Office Action," Australian Patent Application No. 2006240518, mailed Nov. 12, 2009.
USPTO, Final Office Action, mailed Nov. 6, 2009; U.S. Appl. No. 09/809,868, filed Mar. 15, 2001.
USPTO, Final Office Action mailed Nov. 12, 2009; U.S. Appl. No. 11/620,707, filed Jan. 7, 2007.
Newton's Telecom Dictionary, 21st ed., Mar. 2005.
European Patent Office, European Search Report, mailed Sep. 28, 2009 for European Application No. EP 06 78 6175.
USPTO Final Office Action mailed Jan. 25, 2010; U.S. Appl. No. 11/734,277, filed Apr. 12, 2007.
USPTO, Non-Final Office Action mailed Nov. 23, 2009; U.S. Appl. No. 11/683,862, filed Mar. 8, 2007.
International Search Report for PCT/US2008/069914 mailed Dec. 19, 2008.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
USPTO, Non-Final Office Action mailed Oct. 1, 2009; U.S. Appl. No. 11/778,287, filed Jul. 16, 2007.
USPTO Final Office Action mailed Dec. 30, 2009; U.S. Appl. No. 11/147,664, filed Jun. 7, 2005.
Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.
Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.
PCT Partial International Search, PCT/US2009/054893, mailed Dec. 23, 2009.
Srisuresh, P. et al. "Traditional IP Network Address Translator (Traditional NAT)," Network Working Group, The Internet Society, Jan. 2001.
China State Intellectual Property Office "First Office Action," Jan. 8, 2010; Application No. 200810126554.0.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.
.Gurzhi, Alexander et al. "Systems and Methods for Emulation Network-Enabled Media Components," U.S. Appl. No. 12/711,830, filed Feb. 24, 2010.
Newton's Telcom Dictionary, 20th ed., Mar. 2004.
"The Authoritative Dictionary of IEEE Standard Terms," 7th ed. 2000.
Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0-7803-6452-3, lines 15-20 of sec. II on p. 293, fig. 1.
European Patent Office, International Searching Authority, "International Search Report and Written Opinion," mailed Jun. 4, 2010 for International Application No. PCT/IN2009/000728, filed Dec. 18, 2009.
USPTO Non-Final Office Action mailed Jun. 23, 2010; U.S. Appl. No. 11/933,969, filed Nov. 1, 2007.

(56) References Cited

OTHER PUBLICATIONS

Korean Intellectual Property Office "Official Notice of Preliminary Rejection," issued Jun. 18, 2010; Korean Patent Application No. 10-2008-7021254.
USPTO Non-Final Office Action mailed Aug. 11, 2010; U.S. Appl. No. 11/111,265, filed Apr. 21, 2005.
USPTO Final Office Action mailed Sep. 24, 2010; U.S. Appl. No. 11/620,707, filed Jan. 7, 2007.
Canadian Patent Office "Office Action" mailed Mar. 17, 2011; Canadian Patent Appln. No. 2,606,235.
USPTO "Final Office Action" mailed Mar. 10, 2011; U.S. Appl. No. 11/111,265, filed Apr. 21, 2005.
USPTO Non-Final Office Action mailed Sep. 30, 2010; U.S. Appl. No. 12/758,196, filed Apr. 12, 2010.
USPTO Non-Final Office Action mailed Oct. 4, 2010; U.S. Appl. No. 12/643,812, filed Dec. 21, 2009.
Japan Patent Office "Notice of Grounds for Rejection (Office Action)," mailed May 25, 2010; Patent Application No. 2007-0268269.
Japan Patent Office "Notice of Grounds for Rejection (Office Action)," mailed May 25, 2010; Patent Application No. 2007-527683.
China State Intellectual Property Office "First Office Action of China State Intellectual Property Office," issued Oct. 9, 2010; Application No. 200780030811.4.
European Patent Office "EPO Communication" dated Nov. 29, 2010; Application No. 08 167 880.7-2202.
Korean Intellectual Property Office "Official Notice of Preliminary Rejection," issued Dec. 29, 2010; Patent Application No. 10-2009-7003607.
China State Intellectual Property Office "Second Office Action of China State Intellectual Property Office," issued Aug. 26, 2010; Application No. 200810126554.0.
Sikora, Thomas "Trends and Perspectives in Image and Video Coding," Proceedings of the IEEE, vol. 93 No. 1, pp. 6-17, Jan. 1, 2005.
Vetro, Anthony et al. "Video Transcoding Architectures and Techniques: An Overview," IEEE Signal Processing Magazine, vol. 20, No. 2, pp. 18-29, Mar. 1, 2003.
De Lattre, Alexis et al. "VideoLAN Streaming Howto," Internet Citation, Jan. 22, 2005; http://www.videolan.org/doc/streaming-howto/en/.
European Patent Office "Extended European Search Report" dated Feb. 28, 2011; Appln. No. 06734554.
Chinese Intellectual Property Office "Office Action" mailed Apr. 10, 2012 for Chinese Application 200810126554.0.
Japan Patent Office "Office Action" mailed Feb. 28, 2012 for Japanese Application P2008-507651.
Canadian Intellectual Property Office "Office Action" mailed on Feb. 16, 2012 for Canadian Application 2,660,350.
Taiwan Intellectual Property Office "Office Action" mailed Feb. 23, 2012 for Taiwan Application 097137393.
USPTO "Non-Final Office Action" mailed Feb. 24, 2012; U.S. Appl. No. 13/240,932, filed Sep. 22, 2011.
China Intellectual Property Office, "Second Office Action" mailed Feb. 15, 2012; Appln. No. CN200680022520.6.

China State Intellectual Property Office, "Reexamination Office Action" mailed Mar. 5, 2012; Chinese Appln. No. 200580026825.X.
European Patent Office, Extended Search Report mailed May 24, 2013 for European Patent Application No. 07814265.0.
USPTO, Final Office Action mailed May 8, 2013 for U.S. Appl. No. 13/194,783.
USPTO, Office Action mailed May 8, 2013 for U.S. Appl. No. 13/194,834.
USPTO, Office Action mailed Jun. 19, 2013 for U.S. Appl. No. 12/827,964.
USPTO, Office Action mailed Jun. 20, 2013 for U.S. Appl. No. 13/615,306.
USPTO, Notice of Allowance mailed Jun. 24, 2013 for U.S. Appl. No. 12/635,138.
USPTO, Final Office Action mailed Jul. 17, 2013 for U.S. Appl. No. 13/079,644.
China State Intellectual Property Office, Office Action, dated Jul. 1, 2013 for China Patent Appln. No. 200680022520.6.
China State Intellectual Property Office "Fourth Office Action" dated Mar. 5, 2013 for Chinese Patent Appln. No. 200810161874.X.
Intellectual Property Office "Office Action" dated Feb. 25, 2013 for Taiwan Patent Appln. No. 098146025.
Japanese Patent Office "Decision of Rejection (Final Rejection)" dated Jan. 29, 2013 for Japanese Patent Appln. No. 2008-507651.
European Patent Office Supplementary Search Report dated Mar. 6, 2013 for European Patent Appln. No. 05758509.3.
USPTO "Non-Final Office Action" dated Mar. 11, 2013 for U.S. Appl. No. 13/079,644.
European Patent Office, Communication Pursuant to Article 94(3) EPC, dated Jul. 25, 2013 for European Patent Application No. 05 758 509.3.
China State Intellectual Property Office, First Office Action, dated Aug. 2, 2013 for China Patent Application No. 200980151308.3.
US Patent and Trademark Office, Non-Final Office Action, dated Aug. 7, 2013 for U.S. Appl. No. 13/609,033.
Japan Patent Office, Hearing, dated Aug. 13, 2013 for Japanese Patent Application No. P2008-507651.
Canadian Intellectual Property Office, Office Action, dated Sep. 3, 2013 for Canadian Patent Application No. 2,660,350.
European Patent Office, Communication Pursuant to Article 94(3) EPC, dated Sep. 6, 2013 for European Patent Application No. 12 187 858.1.
US Patent and Trademark Office, Notice of Allowance, dated Sep. 20, 2013 for U.S. Appl. No. 13/079,644.
China State Intellectual Property Office, Rejection Decision, dated Sep. 29, 2013 for China Patent Application No. 200810161874.X.
Canadian Intellectual Property Office, Office Action, dated Sep. 30, 2013 for Canadian Patent Application No. 2,747,539.
US Patent and Trademark Office, Final Office Action, dated Dec. 5, 2013 for U.S. Appl. No. 13/194,834.
US Patent and Trademark Office, Non-Final Office Action, dated Jan. 6, 2014 for U.S. Appl. No. 12/827,964.
US Patent and Trademark Office, Non-Final Office Action, dated Jan. 6, 2014 for U.S. Appl. No. 13/615,306.
Government of India Patent Office, First Examination Report, dated Jan. 18, 2014 for India Patent Application No. 921/CHENP/2009.

* cited by examiner

CAPTURING AND SHARING MEDIA CONTENT

CROSS REFERENCE TO RELATED APPLICATIONS

This application claims the benefit of and is a continuation of U.S. application Ser. No. 11/620,707, filed on Jan. 7, 2007; U.S. application Ser. No. 11/620,707 claims the benefit of U.S. Provisional Application No. 60/823,066, filed on Aug. 21, 2006; U.S. application Ser. No. 11/620,707 is also a continuation-in-part of U.S. application Ser. No. 11/147,664, filed on Jun. 7, 2005, which claims the benefit of U.S. Provisional Application No. 60/577,833, filed on Jun. 7, 2004.

BACKGROUND

1. Field of Invention

This invention relates generally to media players, and in particular to capturing and sharing media content among users.

2. Background of the Invention

Television and other video content, are increasingly being delivered to consumers in new ways. For example, the digital video recorder is an example of a device that leverages the flexibility of digital media and its storage to provide a new level of convenience relating to television viewing as well as recording. Also, television programming and a myriad of other multimedia are increasingly finding a home on new devices. For example, television programming is no longer found solely on the television. Through computer networks, as well as other delivery mechanisms, television and other media content are increasingly becoming available on other devices, such as personal computers, mobile phones, PDAs, and other portable computing devices. The broader availability of media on these devices, as well as the inherent flexibility of digital media also provides a host of new ways for consumers to share content with friends, family, as well as the community at large.

Sharing video and other content with communities of others is becoming increasingly popular. Web sites which host content uploaded by others for sharing, such as YouTube, are also becoming quite popular. However, the percentage of individuals that actually contribute content clips and other media to such sites is miniscule. One reason for this is that the process of clip contribution is cumbersome and time consuming. Platforms upon which consumers watch video, and the sources of such video, such as televisions, DVRs, personal computers, and mobile phones, do not provide for a sufficiently integrated and easy to use solution for content viewing, capture, edit, and upload.

For example, a user that is watching a television show via a DVR (such as TiVo) connected their living room television may see something that catches his interest. Furthermore, he may have a desire to share what he just saw with a friend or a community of individuals. If so, he must engage in a multi-step process, which likely involves multiple applications using multiple devices to accomplish the task of capture, edit, and upload. First, the user must connect the DVR to another device, such as a PC, in order to capture in a format for upload. This likely involves connecting the DVR via analog cables to a PC with a video capture card. The user would use an application such as Windows Media Encoder to digitize the content to create compressed digital file. Once that file is created, the user can then visit a community web site, which may have its own tools for allowing the consumer to upload the video. As part of this process, the video may need to be transcoded into a format compatible with the Web site, which would add additional time to the process. This process is both user unfriendly and inefficient.

If the consumer does not have a DVR which allows him to revisit a clip for later formatting, editing, and upload, an additional problem is encountered. That is, the user will need to anticipate that an upcoming video segment will be of interest and worth recording and sharing. A user must start recording the media steam in advance. For example, in order to record the latest news on TV, the user can learn the scheduled broadcasting time of the news from TV Guide and start recording the TV broadcasting before that time. Therefore, if the user notices something interesting in the media stream that he or she did not expect, it is already too late for the user to record the interesting content.

Thus, from the above, there is a need for an improved system and process for users to record media content and share the recorded media content with other users.

SUMMARY

Embodiments of the invention allow users to capture media content from a media source or stream while playing it and then share the captured media content with other users through an integrated user interface in a media device.

In one embodiment, within a single interface, the media device receives a media stream, plays the media stream, and caches a portion of the media stream as it is being played. While viewing the media, a user provides a user interface with a command to capture a segment of the media stream being played on the device. The captured segment may comprise, for example, a video clip. In one embodiment, the user can use the user interface to define the clip by selecting start and end boundaries in the cached portion of the media stream and to input meta data describing the clip. The media device creates the media clip based on the user's input and transmits the clip to another system, such as a community website for sharing the clip with other users.

Figure 1:
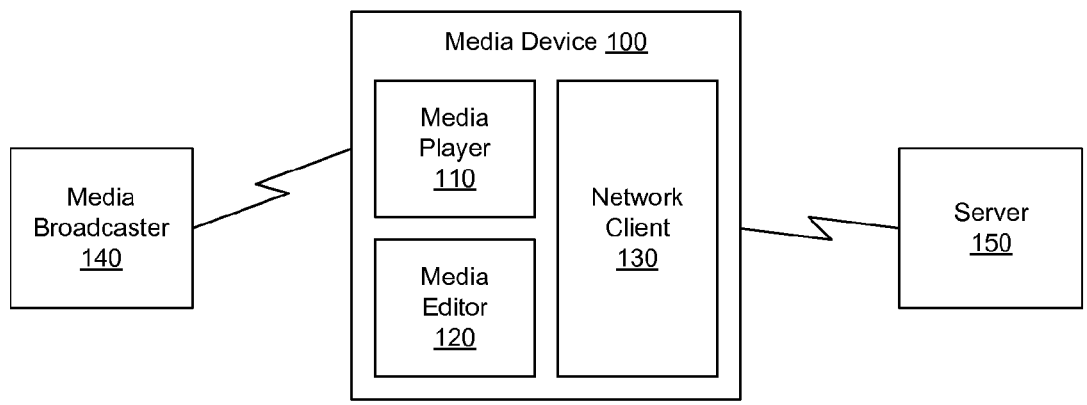
FIG. 1 is a block diagram illustrating an architecture of a media device, in accordance with an embodiment of the invention.

One skilled in the art will readily recognize from the following discussion that alternative embodiments of the structures and methods illustrated herein may be employed without departing from the principles of the invention described herein.

DETAILED DESCRIPTION OF THE EMBODIMENTS

Overview

Embodiments of the invention provide an integrated user interface to users of a media device to view media content, record media clips, edit the clips, associate the clips with relevant meta data, and share the processed media clips with others. As used herein, media content and media clips may include any type of media content, including audio or video content, or both. Users can view a media stream, record a portion of the media stream they deemed interesting into a media clip, and send the media clip to others using the integrated user interface.

Embodiments of the invention allow users of a media content management system to share media content with other users of the system. Users of the media content management system can upload media content (e.g., media clips) to the system to share the uploaded media content to others, who can download that media content from the system. Alternatively, the media may ultimately be distributed to viewers via a peer to peer distributed system. That is, the content may be alternatively stored on the computers and other devices of the end users of the system. When a user wishes to view a clip from the system, the clip is sourced from one or more of the other users, or peers.

Embodiments of the invention allow owners of the shared media content ("content owners") to control the use of their content. Content owners can set a broad range of restrictions on their media content limiting the use of their media content. Examples of the restrictions include the duration, the quality (e.g., resolution, frame rate of a video content, bit rate of an audio content), and the number of people allowed to access the media content.

Embodiments of the invention may also enable the operator of the media content management system to generate advertising revenue. The system combines media content with advertisements and provides the combined media content and advertisements to users upon their requests for the media content. The advertising revenue includes advertising fees paid by advertisers for providing their advertisements to the users. The advertising revenue can be shared with the content owners for their permission to share their content with the users of the system. Advertisements may be sold by the operator of the media content management system or the content owners. Advertisements may also be sold via the use of an automated ad purchase system using key words or other meta data available which is associated with a clip. That is, a small business may want to place an ad opposite any clip of a specific show. Perhaps through a web interface, the small business owner could purchase the ad and upload the creative content which would be shown as an advertisement whenever a clip of the desired show is viewed by a user.

The media content management system described herein can also promote the lawful sharing of copyrighted media content by giving the copyright owners right to control the use of their media content and sharing the advertising revenue generated by distributing advertisement with their media content.

Media Device Architecture

FIG. 1 is a block diagram of the architecture of a media device 100 in accordance with one embodiment of the invention. As illustrated, the media device 100 includes a media player module 110, a media editor module 120, and a network client module 130. The media device 100 is communicatively connected to a media broadcaster 140 and a server 150.

The media device 100 includes hardware and/or software devices that are configured to enable users to view media content; record, edit, and associate meta data with the media clip ("clipping"); and share the recorded media clip with others through a single, integrated user interface. The media device 100 is adapted to execute computer program modules. As used herein, the term "module" refers to computer program logic and/or data for providing the specified functionality. A module can be implemented in hardware, firmware, and/or software.

In one embodiment, the media device 100 is a software application running on any general or multi-purpose device (such as a personal computer, mobile device, cellular phone, or any other computing device with sufficient capabilities for these tasks), beneficially avoiding the need for users to carry special equipment to transmit media content to and/or receive media content from the media management server 410. Alternatively, the media device 100 can be a dedicated appliance, such as a place-shifting system or a personal video recorder (PVR). In the case of a placeshifting system (an example of which is the Slingbox from Sling Media), the placeshifting appliance interacts with software located on another device such as a PC or mobile phone by streaming content from the placeshifting appliance to the client device.

The media player module 110 is configured to play media content received from the media broadcaster 140, which may be any source of media, including a placeshifting device. The media content may be delivered to the media device 100 in a variety of ways, including over the air transmission (analog and digital), via cable infrastructure, IP transport (via wired and wireless means), satellite transmission, as well as through many other methods. The models for delivery of content to the media device 100 may vary, including pay-per-view, linear programming, on demand streaming, download and playback, and live streaming from another location, placeshifting, among many others.

The media editor module 120 is configured to provide users with functionality of recording (or capturing) the media content played by the media player module 110. In one embodiment, the media editor module 120 can cache the media content played and provide users with an editing window to define a media clip from the cached content. This allows a user to capture, process, edit, and upload easily a clip that they recently viewed. The media editor module 120 can be further configured to converting the defined media clip from one media format to another or perform any other transcoding, encoding, or other processing on the clip as desired.

The network client module 130 is configured to transmit the recorded media clip to the server 150, or alternatively, to other end users in a distributed storage and distribution architecture. The network client module 130 can be configured to connect with the server 150 through a wired or wireless network. Examples of the network include the Internet, an intranet, a cellular network, or a combination thereof. The server 150 can be a web server, an email server, or other computing devices with network capacity.

The media broadcaster 140 transmits the media content to the media device 100. It can be a central server at a remote broadcasting location, or a computer at a user's home. In one embodiment, the media broadcaster 140 can be a time-shifting device (e.g., a personal video recorder) or a placeshifting device (e.g., a personal broadcaster). In placeshifting, a user can watch or listen to live, recorded or stored media on a remote device via a data network. For example, a user may stream content from a device at home (such as a satellite receiver, cable box, or digital video recorder) to a cellular phone, which can receive the media from across the house, across town, or across the world. This transmission may use public or private networks. A product that currently provides such a placeshifting application is the SLINGBOX™ from Sling Media, Inc., and described in co-pending U.S. application Ser. No. 11/147,664, filed Jun. 7, 2005, the content of which are incorporated by reference in its entirety.

Operation of the Media Device

Figure 2:
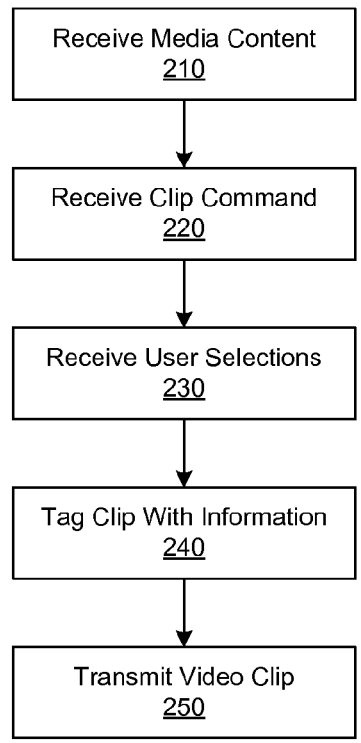
FIG. 2 is a flowchart of a process for recording and sharing media clips, in accordance with an embodiment of the invention.

FIG. 2 is a flowchart of a process of the media device 100 for recording (or clipping) and sharing media clips in accordance with one embodiment of the invention. The process illustrated in FIG. 2 may be implemented in software, hardware, or a combination of hardware and software.

Figure 3A:
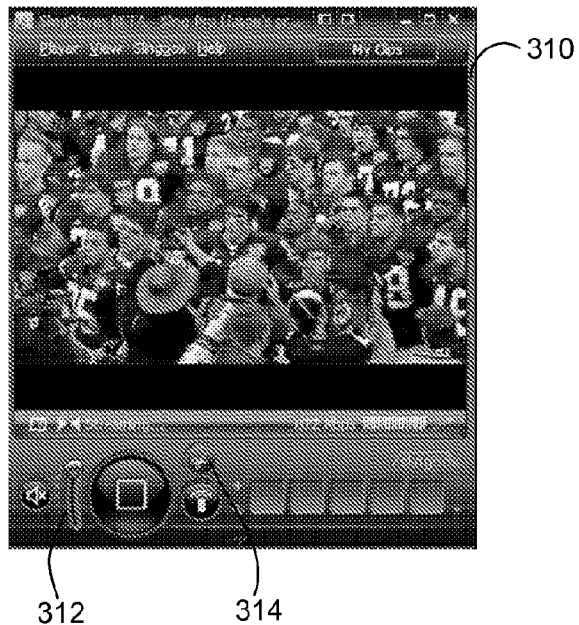
FIGS. 3(a)-(c) illustrate examples of user interfaces for recording and sharing media clips, in accordance with an embodiment of the invention.

The process illustrated in FIG. 2 starts with the media device 100 receiving 210 media content from the media broadcaster 140. The media content can be in the form of a media stream (e.g., television broadcasting). In one embodiment, the media player module no plays the media stream on the integrated user interface. One example of this user interface is illustrated in FIG. 3(a). The user interface in FIG. 3(a) includes a media display window 310 to display the received video stream live, which includes controls for users to control the video play (e.g., volume control 312, record button 314) and indicators indicating the status of the video stream (e.g., network transmission speed, video stream status, and video stream title).

Referring back to FIG. 2, the media device 100 receives 220 a command from a user to clip or otherwise capture a portion of the media. The user may submit the command by interacting with the integrated user interface. For example, the user can trigger a designated control (e.g., the record button 314) using a pointing device (e.g., a mouse or touch sensitive screen) or using a keypad. Alternatively, the user may submit the command using devices such as a remote control (e.g., a remote control for a DVR, cable box, satellite receiver, or other media source).

Once the device 100 receives the command, the media editor module 120 may bring up a media editing window in the integrated user interface. The media editing window allows the user to select the starting point and the ending point of the media content that the user would like to capture. In one embodiment, as the media player module 110 plays the media stream, the media editor module 120 continually captures and caches the last five minutes (or some other designated time period) of media content played. The media editor module no may be configured to discard the earliest recorded content when the cached stream hits five minutes (or some other designated time period) so that the media that is cached is always the most recent media that has been played. This allows the user to select a portion of what is currently in the cache. In another embodiment, such as with a PVR, the media stream being played by the device 100 may already be stored in a memory, so there is no need to cache a portion of the media being played. In such a case, the captured clip is just a cropped version of a larger media file already stored in memory.

Figure 3B:
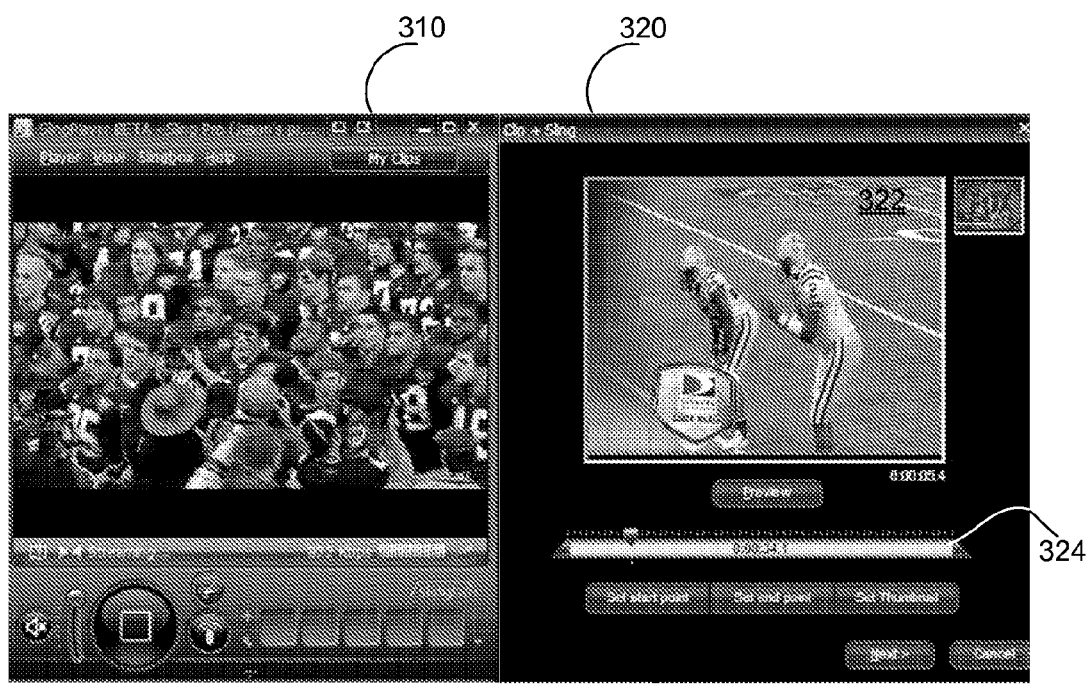

One example of this user interface is illustrated in FIG. 3(b). The user interface in FIG. 3(b) displays the media editing window 320 adjacent to the media play window 310. The media editing window includes a video window 322 displaying the cached media content. The video editing window also includes a slider 324 below the video window representing the duration of the cached portion of the video stream. As shown in FIG. 3(b), the media editing window 320 is displayed adjacent to the media play window 310; however, the media editing window 320 may be displayed as a separate window or by any other method as desired for the user interface.

Referring back to FIG. 2, the media device 100 receives 230 user selections for defining a desired media clip. In one embodiment, a user can select the desired start point and end point through the media editing window. For example, in the user interface illustrated in FIG. 3(b), a user can make the selection by marking the start and end points on the slider 324. In one embodiment, the media device 100 checks and enforces restrictions contained in the metadata of the media stream or otherwise associated therewith. For example, if the restrictions limit the duration of a clip, the media device 100 will not allow the media clip to exceed that limit. The user may also select a frame within the media clip as a representative thumbnail image for the media clip. The media device 100 creates a media clip based on the user selection.

The media device 100 may also tag 240 information to the media clip, such as meta data that describes the clip. The information to be tagged can be manually input by the user and/or it may be automatically associated with the clip. For example, once the clip is captured, the user may input words, phrases, pictures, URLs, titles, actors, networks, channels, or other meta data that the user believes should be associated with the clip. Alternatively or additionally, other methods for automated tagging may be used, such as methods that automatically determine information about the content of the clip and tag the clip with that information. This information may be retrieved from a number of sources, including an electronic program guide (EPG) or the settings on the computing devices. Other observed information may also be a source for tagging information, including the time of day, time zone or location, channel number, title of show, episode, network, etc. The information may further include information expressly associated with the video clip, which may be delivered via the VBI, over an IP network, or by some other means. Other information, such as the closed captioning, may also be a source for automatic tagging. The information tabbed to the media clip can be stored in its metadata. In some embodiments, the user can also change the format of the media clip and set other encoding parameters, such as bit rate.

The media device 100 can transmit 250 the media clip as the user instructs. The user can submit the instruction through the integrated user interface. For example, the media edit window can include a designated button for uploading the media clip to a community website. The user can configure the button to send automatically, manually post, or otherwise upload the media clip to the community website or other online location. The user can configure the button to link with his account in the website. The user can click the button and the network client module 130 will upload the media client. Alternatively, the media edit window can include a drop-down menu allowing the user to select recipients of an email notification. After the media clip is uploaded, a notice will be sent to the email addresses of the selected recipients, noticing them that the user has uploaded a clip, with a pointer reference to the clip stored on the website. This allows the user to share content with a community of users rather than a particular selected person or persons. The community sharing model also enables certain business and advertising schemes, described in greater detail below. In other embodiments, the user can also instruct the media device 100 to save the media clip in a local or remote location.

Alternatively, rather than uploading the media clip, the media device 100 may call an email client (or other local communication client) to create a new email message and attach the media clip to the message. The user can then select the intended recipients of the message and send the message. The media device 100 can also automatically send out the message if the recipient or destination of the video clip has already been determined. The address book databases can be those available from email clients such as Microsoft Outlook, Lotus Notes, and others, as well as any Internet based messaging services, such as MSN Messenger and AOL Instant Messenger.

Example Process for the Media Device

The process described above can be further illustrated through an example of an operation of the media device 100 in accordance with one embodiment of the invention. In this example, the media device 100 is a laptop computer. The media device 100 receives a video stream from a placeshifting system (e.g., a SLINGBOX™) and plays the video stream in an integrated user interface on the computer screen to a user.

When watching the video stream, the user sees something he would like to share with friends. The user presses the record button on the integrated user interface, which immediately launches a media editing window within the application. Within the media editing window, the user has access to last five minutes (or some other duration) of video viewed, which was cached on the hard drive of the laptop computer. The user sets the start point and end point, adds a title to the clip, and presses a recipient button, which brings up a list of friends. The user selects the intended friends. Meta data associated with the clip may also be added manually or automatically. Then the user clicks an upload button on the integrated user interface. The media device 100 uploads the video clip to a community website, and sends a notification email with a pointer reference to the uploaded video clip to the selected friends.

After receiving the notification email, the user's friends can click the pointer and view the video clip in the community website.

Similar experiences are also possible with other devices and solutions. For example, a similar experience can be had on a mobile phone that receives a video stream from a placeshifting device. Alternatively, the interface can be integrated into a DVR connected to the Internet, with the clipping experience presented to the user via a television set and controlled via a remote control. In yet another alternative, the interface may be used on a PC that is not receiving content via a placeshifting device but rather directly via an audio video input (e.g., cable coax) into the PC. Accordingly, the process of viewing, clipping, and sending clips can be advantageously used in a number of different contexts.

Media Content Management System Architecture

Figure 4:
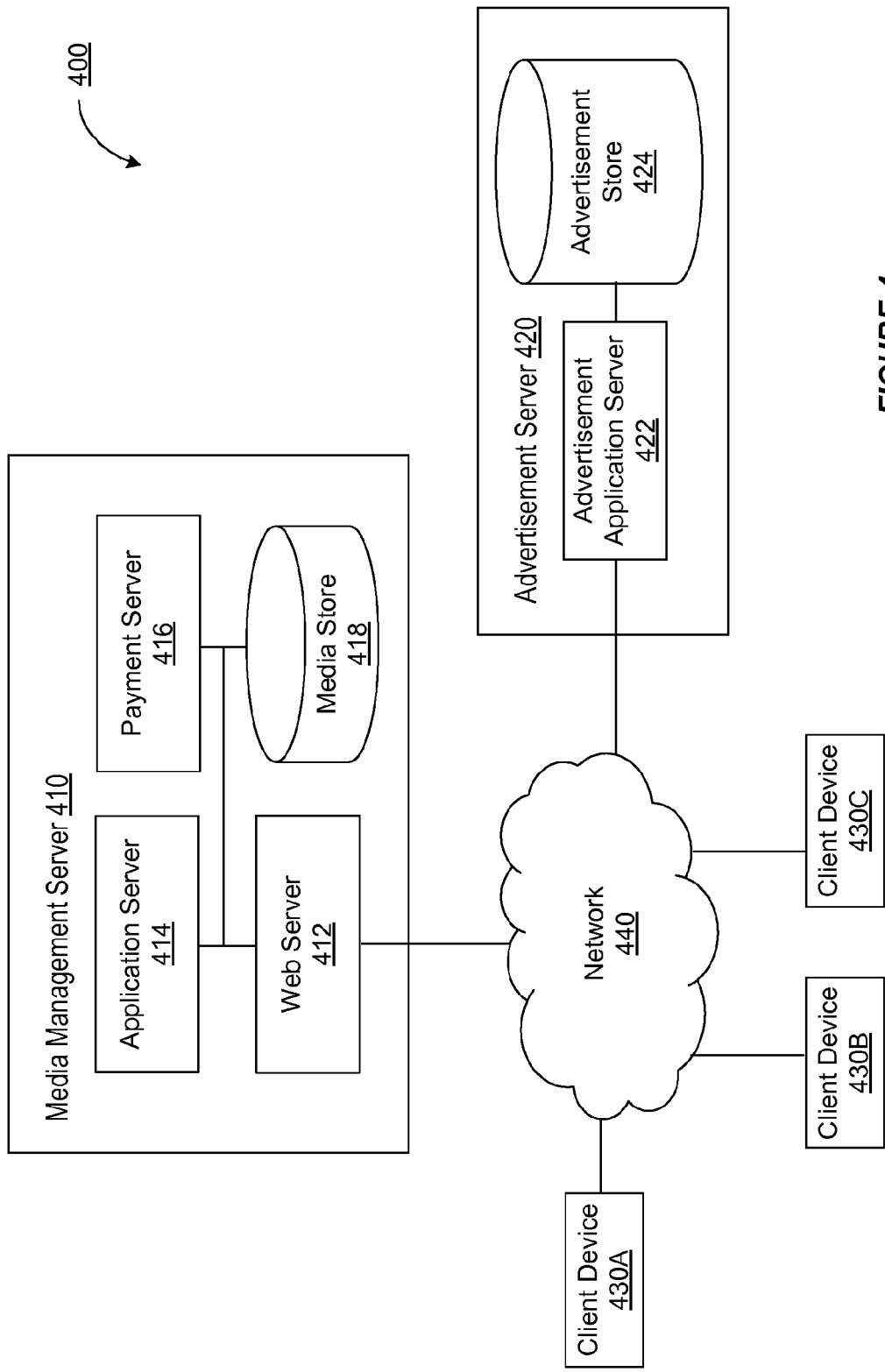
FIG. 4 is a block diagram illustrating an architecture of a media content management system, in accordance with an embodiment of the invention.

FIG. 4 is a block diagram of the architecture of a media content management system 400 in accordance with one embodiment of the invention. In this embodiment, the system 400 includes a media management server 410, an advertisement server 420, and three client devices 430A-C. The media management server 410, the advertisement server 420, and the client devices 430 are communicatively coupled through a network 440.

The media management server 410 includes a hardware and/or software device that is configured to receive media content from and/or provide the received media content to the client devices 430 through the network 440. Media content may include data in medium such as text, audio, still images, video, and graphics, and a combination thereof. Media content can be in different formats. For example, audio content can be encoded in Windows Media Audio (WMA) format or in MPEG-1 Audio Layer-3 (MP3) format. In one embodiment, the media management server 410 includes a web server 412, an application server 414, a payment server 416, and a media store 418. The media management server 410 can also include other components (e.g., an email server), although FIG. 4 omits such components for clarity.

The web server 412 is a front end of the media management server 410 and functions as a communication gateway of the media management server 410. The web server 412 receives media content transmitted to the media management server 410 from the client devices 430 through the network 440 and stores the received media content in the media store 418. The web server 412 also receives requests for specific media content units from the client devices 430, retrieves the requested media content units from the media store 418, and provides them to the client devices 430. In one embodiment, the web server 412 is an Internet web server hosting one or more websites.

The web server 412 can support multiple communication protocols for the client devices 430 to send and request media content. For example, the web server 412 can be configured to support file transfer protocol (FTP) such that the client devices 430 can provide and/or access media content using FTP. As another example, the web server 412 may host webpages for users to upload and/or download media content. The web server 412 can provide media content to the client devices 430 in the form of media files or media streams that are suitable for transmission over the network 440, where the media streams can be viewed by end users at the client device 430.

The application server 414 is configured to combine media content with advertisements and provide the combined media content and advertisement to the web server 412. Like media content, advertisements can include data in medium such as texts, audio and video. In some embodiments, instead of advertisements, the application server 414 combines media content with other information (e.g., information about the subject matter of the media content).

The payment server 416 is configured to track balances of related parties (e.g., advertisers, copyright owners, users) based on a payment model. The payment server 416 can also work with the web server 412 to provide the related parties online access to their accounts. The related parties can check account balance, make payments, and transfer funds to their other accounts by accessing their accounts. The payment server 416 can also periodically send invoices and account balance reports to the related parties. In one embodiment, the payment server 416 can be configured to enable the related parties to connect their accounts with their bank accounts and authorize the payment server 416 to automatically deposit money to and/or withdraw money from their bank accounts.

In one embodiment, the payment server 416 is also configured to keep track of the relationships between the media content and the related parties. The relationships include content owners and their media content, advertisers and their advertisements, and users and the media content that they uploaded and/or downloaded. Multiple parties can have ownership interests in one media content unit. For example, a video clip can have multiple copyright holders and multiple licensees. The identities of these content owners can be provided in the metadata accompanying the media content unit. In one embodiment, the payment server 416 creates an account for each content owner and links the account with media content units the content owner has interests in. For example, the account for the Walt Disney Studios can be associated with all video content and graphical content having the image of Mickey Mouse along with other media content owned by the Walt Disney Studios. Similarly, the payment server 416 can also create an account for each advertiser and associate the account with its advertisements, and create an account for each user and associate the account with media content units the user uploaded and/or downloaded. This information can be used to determine balances of the parties. The account information can be saved in the media store 418 together with the media content.

The media store 418 stores the data received from the web server 412, the application server 414 and the payment server 416. These data include media content received from the client devices 430, information associated with the media content (e.g., ownership information), and information about the related parties (e.g., account information). The media store 418 may be a relational database or any other type of database that stores the above-described data. The media store 418 may be accessible by the web server 412, the application server 414, and the payment server 416. The web server 412, the application server 414, the payment server 416, and the media store 418 may be stored and operated on a single computer or on separate computer systems communicating with each other through a network.

The advertisement server 420 includes a hardware and/or software device that is configured to provide advertisements to the media management server 410 and/or the client devices 430. In one embodiment, the advertisement server 420 includes an advertisement application server 422 and an advertisement store 424.

The advertisement application server 422, similar to the web server 412 in the media management server 410, is configured to receive advertisements transmitted to the advertisement server 420 and stores the received advertisements in the advertisement store 424. The received advertisements may include associated ownership information.

The advertisement store 424 stores the advertisements and associated ownership information received from the advertisement application server 422. Similar to the media store 418, the advertisement store 424 may be a relational database or any other type of database. The advertisement store 424 may be stored centrally and operated on a single computer. Alternatively, the advertisement store 424 can include multiple databases, each individually maintained by an advertiser.

In one embodiment, the advertisement server 420 can be combined with the media management server 410. For example, the application server 414 and the web server 412 can be configured to implement the functions of the advertisement application server 422, and the media store 418 can be configured to store the advertisements and associated ownership information that would otherwise be stored in the advertisement store 424.

The client devices 430A-C include hardware and/or software devices that are configured to transmit media content to and/or receive media content from the media management server 410 and/or the advertisement server 420. The client devices 430 can optionally include displays (e.g., an LCD screen) and speakers. In one embodiment, one or more of the client devices 430 can be a media device 100. There can be many client devices 430 in the system 400. FIG. 4 displays only three client devices 430 for clarity.

In one embodiment, the client device 430 is configured to play the combined media content and advertisements received from the media management server 410 and/or the advertisement server 420. For example, the client device 430 can include the media player client as described above, which can play video clips received from the media management server 410 to end users.

In one embodiment, the media management server 410, the advertisement server 420 and the client devices 430A-C are structured to include a processor, memory, storage, network interfaces, and applicable operating system and other functional software (e.g., network drivers, communication protocols).

The network 440 is configured to connect the media management server 410, the advertisement server 420, and the client devices 430A-C. The network 440 may be a wired or wireless network. Examples of the network 440 include the Internet, an intranet, a cellular network, or a combination thereof.

Operation of the Media Content Management System

Figure 5:
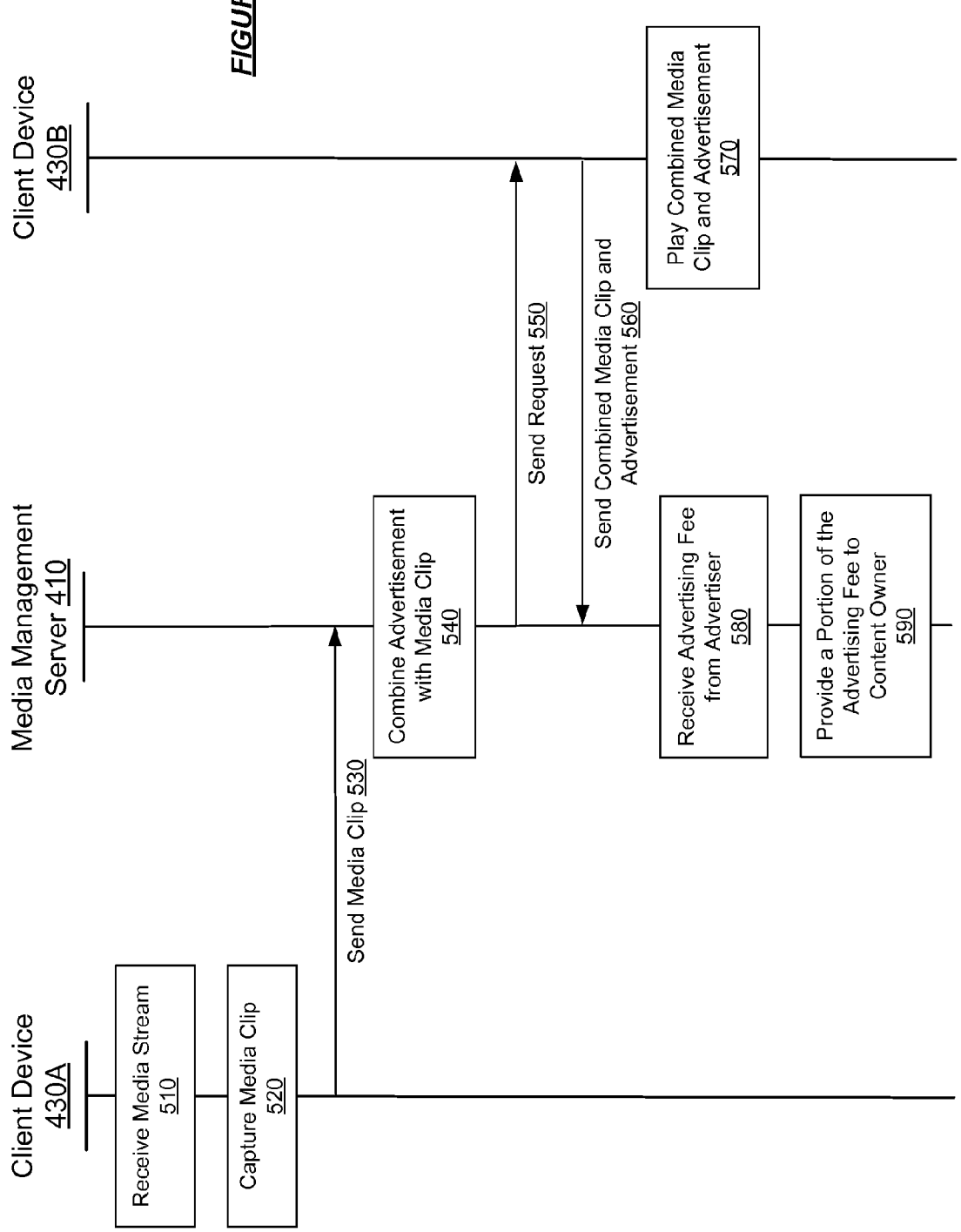
FIG. 5 is an interaction diagram of a process for sharing media content, in accordance with an embodiment of the invention.

FIG. 5 is an interaction diagram of a process of the media content management system 400 for sharing media content in accordance with one embodiment of the invention. In this process, the media management server 410 hosts a community website where users of the website can upload, download, share, and exchange media content (e.g., video clips). The process illustrated in FIG. 5 may be implemented in software, hardware, or a combination of hardware and software.

The process illustrated in FIG. 5 starts with a client device 430A receiving 510 a media stream. As described above with reference to FIG. 5, the client device 430A can include a media device 100 receiving media content and/or media stream from a plurality of sources, such as a TV broadcasting network. The client device 430A can be configured to play the media stream to a user as the stream is received.

The client device 430A captures 520 a media clip in the received media stream. In one embodiment, the client device 430A continually captures and caches the most recently received media stream. The user can use a graphical interface provided by the client device 430A to select the beginning and end of the clip in the cached portion of the media stream that the user would like to capture.

The client device 430A sends 530 the captured media clip to the community website using a communication protocol supported by the web server 412. The web server 412 can require the user to first become a community member by registering an account before they can upload any media content in the community website. The client device 430A can be configured to send 530 the media clip to the community website using the user's account.

Figure 3C:
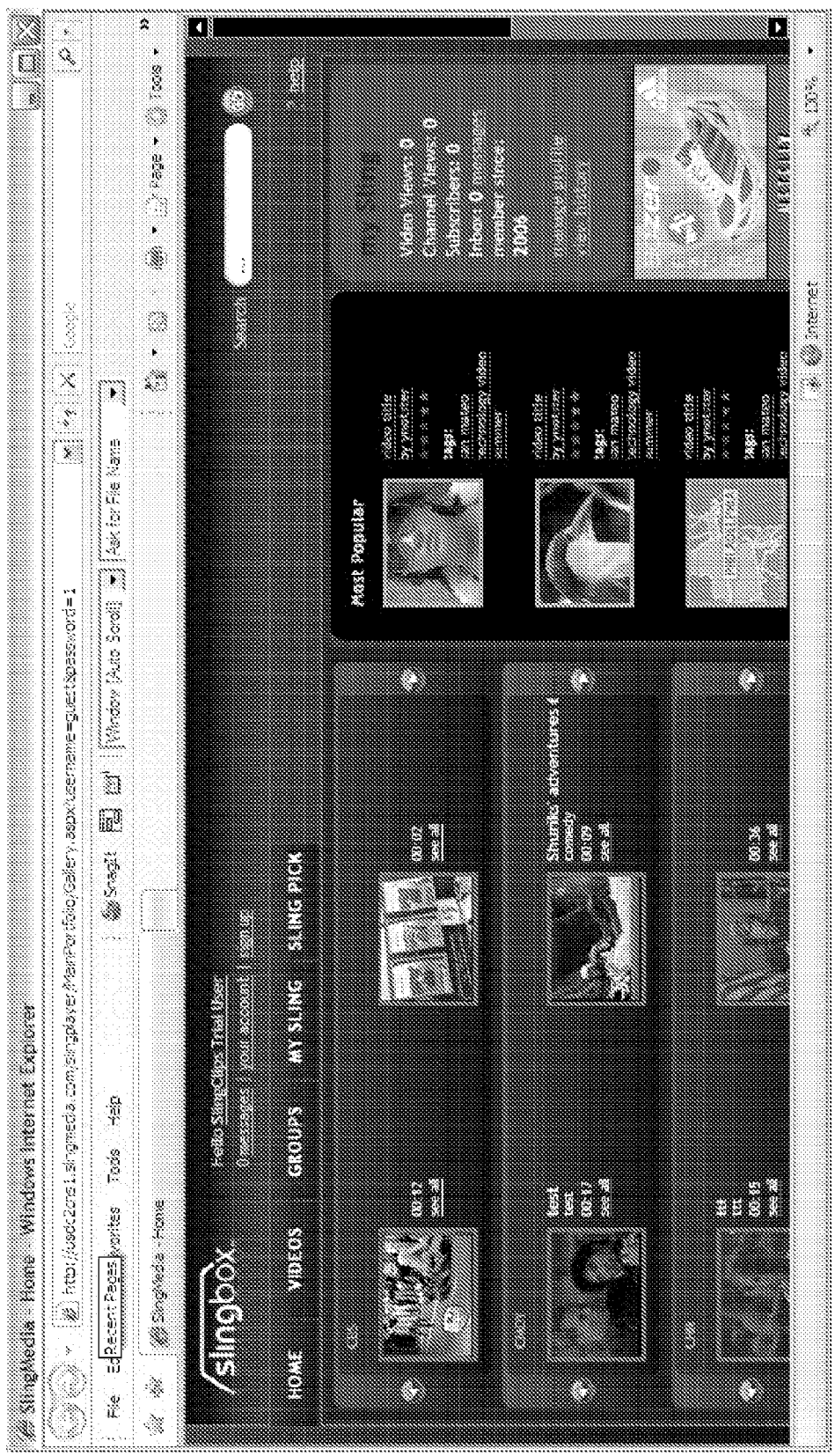

After receiving the media clip from the client device 430A, the web server 412 stores it in the media store 418. In one embodiment, the web server 412 also receives identification information related to the received media clip, and stores it in the media store 418 along with the media clip. The web server 412 can provide the received media clips on the community website for members to access. One example of the community website listing the received media clips is illustrated in FIG. 3(c). The webpage shown in FIG. 3(c) lists media clips received from members of the community website. Users accessing this webpage can access the listed media clips by clicking on them.

The application server 414 combines 540 advertisements with the received media clip. As described above with reference to FIG. 4, the application server 414 can receive advertisements from the advertisement server 420 through the web server 412 and the network 440.

The application server 414 can combine 540 the media clip and the advertisements in different manners. As described above, media content and advertisements can include data in medium such as text, audio, still images, video, and graphics. The application server 414 can determine a manner to combine a media clip and an advertisement based on the forms of information included in the media clip and the advertisement. For example, if both include video and/or audio, the application server 414 can join them together, so that the advertisement leads into or follows the media clip. As another example, the application server 414 can present the advertisement alongside the media clip in a web page, such that interested users can access the web page for the media clip, and thereby view the advertisement. As still another example, the application server 414 can place the advertisement as an overlay to the video portion of the media clip. The application server 414 can combine the advertisements with the media clip when the web server 412 first receiving the media clip or after receiving a request for the media clip. Alternatively, the application server 414 can conduct the combination 540 periodically.

In one embodiment, the application server 414 can be configured to enforce restrictions associated with the media content and the advertisements. The advertisements can have restrictions limiting the media content that can be associated with them. For example, an advertiser can prohibit its advertisements from being associated with media content including adult material. As another example, an advertisement (e.g., an automobile advertisement) can require the associated media content to include content relevant to the subject matter of the advertisement (e.g., video clips about car race). Media content can also have restrictions limiting the advertisements that can be associated with the media content.

In one embodiment, the application server 414 identifies restrictions associated with the media clip and/or the advertisements and combines 540 the media clip and the advertisements only if the associated restrictions are satisfied. For example, the application server 414 can combine 540 the media clip with advertisements by first identifying advertisements that satisfy restrictions associated with the media clip, then selecting one or more of the identified advertisements where the combination does not violate the restrictions associated with the selected advertisements, and combining 540 the media clip with the selected advertisements.

Another user of the community website sends 550 a request for the media clip to the community website using a client device 430B. After receiving the request, the web server 412 provides 560 the combined media clip and advertisements to the client device 430B through the network 440. The web server 412 can provide the combined media clip and advertisements in different manners. For example, the web server 412 can send an email to the user containing the associated advertisement and a pointer reference to the media clip. The user can access the media clip by clicking the pointer reference. Alternatively, the web server 412 can provide the user with a webpage including the combined media clip and the advertisements. After receiving the combined media clip and advertisements, the client device 430B can play 570 it to the user.

The operator of the community website may receive 580 an advertisement fee from an advertiser in exchange for providing 560 the combined media clip and advertisement to the user. As described above with reference to FIG. 4, the payment server 416 keeps track of the relationship between the advertisers and their advertisements. Therefore, the payment server 416 can identify the advertisers associated with the combined advertisements, determine the advertisement fees for the advertisers to pay, and charge the advertisers accordingly.

In one embodiment, the advertisement fees are determined by a standard advertising model (e.g., Pay Per Click Advertising (PPC), Pay Per Thousand Advertising (PPM), Fixed Rate) determined by the operator and the advertisers. Various advertising models that may be used with the system 400 are disclosed in U.S. Provisional Application No. 60/780,709, filed Mar. 8, 2006, the content of which is hereby incorporated by reference in its entirety. The advertising model can provide a range of advertising fees based on multiple factors, such as the nature of the advertisement (e.g., video, audio, or text) and the manner of the association (e.g., the advertisement is joined with a video clip). The payment server 416 can charge the advertising fees from the advertisers by debiting their accounts.

The operator of the community website may also provide 590 a portion of the advertising fees to a content owner in exchange for permission to provide 560 the combined media clip and advertisement to the users. As described above with reference to FIG. 4, the payment server 416 keeps track of the ownership information of the media content. Therefore, the payment server 416 can identify the content owners of the media clip, determine the portion of the advertising fees to the content owners, and credit the content owners accordingly.

In one embodiment, the payment is determined by a royally rate determined by the operator and the content owners. Similar to the advertising model, the royally rate can provide a range of royalty payments based on factors such as the nature of the media content. In one embodiment, the royally is a fixed percentage of the advertisement revenue generated by providing advertisements with media content owned by the content owner. The content owners can also set a fixed fee for their media content. For example, the owner of a home video clip can require 5 per access to the video clip. The payment server 416 can provide 590 the royalty payment to the content owners by crediting their accounts.

Business Model for the Media Content Management System

Figure 6:
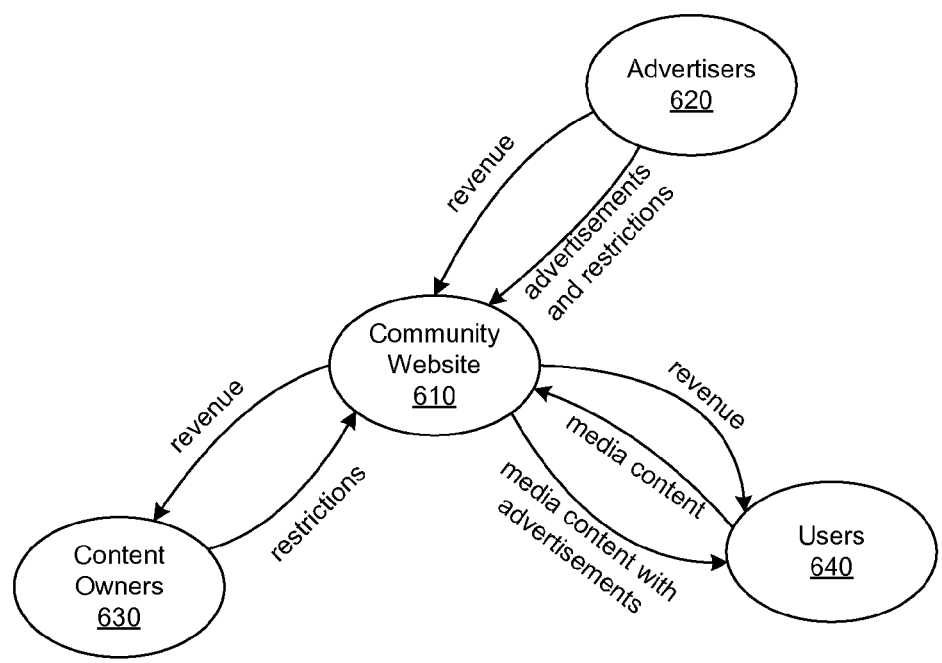
FIG. 6 is a diagram illustrating the interactions among the website, users, advertisers, and content owners in a business model using the media content management system, in accordance with an embodiment of the invention.

FIG. 6 is a diagram depicting the interactions among entities involved in the operation of the media content management system 400 (hereinafter called "the system 400") according to a business model. The interactions illustrated in FIG. 6 may be implemented in software, hardware, or a combination of hardware and software.

As illustrated in FIG. 6, the system 400 can operate to enable users to share and exchange media content, generate advertising revenue by distributing advertisements with the media content, and share the revenue with content owners in exchange for permissions to provide the media content to users with the advertisements. In stead of or in addition to sharing the revenue with the content owners, the system 400 can enables the content owners to control the use of their media content by providing restrictions for permissions to provide their media content to users with the advertisements.

Entities involved in the operation of the system 400 include an operator of the community website 610, advertisers 620, content owners 630, and users 640. The operator runs the media management server 410 to provide a community website 610 for the users 640 to store, share, and exchange media content, and distribute advertisements with the media content to the users 640. The advertisers 620 provide advertisements to the community website 610 to be provided to the users 640 together with the media content in exchange for payments. The users 640 share media content through the community website 610. The content owners 630 give the community website 610 rights to distribute their media content to the users 640 in exchange for payments and/or control.

The community website 610 receives media content from the users 640. As described above with reference to FIG. 4, the community website 610 can require the users 640 to become registered members to upload media content to and/or download media content from the community website 610. The received media content include media content that the users 640 are interested in themselves and/or feel will have a wide appeal to a large audience. The users 640 can also provide descriptive information about the media content to the community website 610.

The community website 610 receives restrictions of the media content from the content owners 630. In one embodiment, a media content unit can have one or more associated restrictions limiting the use of the media content unit. In one embodiment, these restrictions can be provided in the metadata of the associated media content. For example, restrictions associated with a video clip can be transmitted during the Vertical Blanking Interval (VBI) when the video clip is transmitted to the media management server 410. VBI is the period of time between frames in a video transmission when information is still being transmitted but when the information is not being displayed on the screen. Alternatively, the web server 412 can be configured to accept these restrictions separately from the associated media content. For example, the content owners 630 can set restrictions applicable to all or a portion of their media content by interacting with the web server 412. The content owners 630 can also set restrictions applicable to their media content not yet in the media management server 410.

In one embodiment, the community website 610 can enable the content owners to set a broad range of restrictions to their media content, such as: the duration, the quality (resolution, frame rate of a video content, bit rate of an audio content), and the number of people allowed to access the media content. For example, a content owner can set a generic rule like: "All Seinfeld video clips display at lower resolution and may be no longer than 2.5 minutes." After identifying a piece of media content containing a Seinfeld video clip, the community server 610 may allow access to the media content only if the restriction is not violated. The community website 610 can be configured to modify the media content (e.g., reduce the duration and/or resolution of a video) to enforce the associated restrictions. Alternatively, the modification can be conducted on the user side (e.g., the client devices 430 can be configured to enforce the restrictions).

Content owners 630 may also restrict the access to their media content. For example, the content owners 630 can restrict the access to a media content unit to be by invitation only (e.g., sharing video clips with friends and acquaintances) or available only to registered members. Therefore, the community website 610 will allow users 640 to access a media content unit only if the associated restrictions set by the content owners are satisfied.

Content owners 630 may also restrict the advertisements that can be associated with their media content. For example, a media content unit can have a restriction prohibiting any association with automobile advertisements. As another example, a piece of media content can have a restriction limiting the duration of the associated video advertisement.

Under this business model, content owners 630 may have strong incentives to allow sharing of their media content with the public to promote the popularity of the media content and generate more royalty income, even without receiving a portion of any advertising revenue. For example, Walt Disney Studios may specify in the restrictions that its Mickey Mouse media content are publicly available to promote a re-release of a Mickey Mouse movie or to promote visiting its theme parks. The content owners may have additional incentives by allowing third-party advertisers to attach their own advertisements to the clipped video content, by then receiving a portion of or the entire advertising fee.

The community website 610 receives advertisements from the advertisers 620. The community website 610 can also receive restrictions from the advertisers 620. Similar to the restrictions provided by the content owners 630, these restrictions limit the media content to be combined with the advertisements, and thereby enable the advertisers 620 to better target their advertisements to the right audience.

The community website 610 combines the media content with the advertisements. This combination normally must satisfy the restrictions provided by both the content owners 630 and the advertisers 620. The community website 610 then provides the combined media content and the advertisements to the users 640.

The operator receives advertising fees from the advertisers 620 for distributing the advertisements to the users 640. The operator can share this revenue with the content owners 630 for permissions to provide the media content to the users 640 with the advertisements, to the extent the content owners 630 have rights in the media content.

In one embodiment, the community website 610 distributes the advertising revenue among all entities involved in the operation of the system 410, including the operator, the content owners 630, and even the users 640 that uploaded and/or downloaded the media content. In other embodiments, the advertising fees may be shared just between a subset of the parties, such as the content owners 630 and the operator. In still other embodiments, the advertising fees may be shared with other participants in the distribution chain of the media content, such as the operator of the originating television service (such as a cable provider, especially if the media content originate from content served by an associated set top box), an Internet service provider (ISP) that provides the bandwidth used by the source (such as a place-shifting device), and/or the ISP that provides the bandwidth used by the client device 430 (such as a wireless network provider in the case where the client device 430 is a portable device using a wireless network).

As described above, the operator can operate the system 400 to generate advertising revenue by distributing user-supplied media content with advertisements. The operator can share the revenue with the content owners 630 in exchange for permissions to provide the media content to the users 640 with the advertisements. The system 400 also provides the content owners 630 with the ability to control the use of their media content to address their fears of losing control over their media content.

Example Process for the Media Content Management System

The principles described herein can be further illustrated through an example of an operation of the media content management system 400 (hereinafter called "the system 400") in accordance with one embodiment of the invention. In this example, the system 400 hosts a community website 610 where users of the website can share audio/video clips.

The example commences with a user 640 watching a TV program Seinfeld previously captured by a Personal Video Recorder (PVR, client device 430). The user 640 finds a section of the video interesting, and invokes a graphical interface of the PVR to capture the video section by selecting the beginning and end of the section. The PVR creates a video clip (Seinfeld clip) containing the captured video section and upload the Seinfeld clip to the community website 610 using the user's account.

The application server 414 identifies the subject matter of the received clip using the metadata stored during the VBI of the video clip, associates the clip with the content owner, Sony Pictures Digital Inc., and stores the clip and the related information in the media store 418.

A second user 640 of the community website 610 subsequently conducts searches in the website 610 for video clips related to Seinfeld using a computer (client device 430), and locates the Seinfeld clip previously received. The second user 640 then submits a request for the Seinfeld clip.

In response to the second user 640's request, the community website 610 checks the restrictions applicable to the Seinfeld clip. The content owner, Sony Pictures Digital Inc., has set a restriction applicable to all Seinfeld video clips limiting their duration to be no more than 2.5 minutes. After confirming that the Seinfeld clip lasts no more than 2.5 minutes, the community website 610 identifies an advertisement for eBay promoting its Seinfeld related auction items (eBay advertisement). Advertiser eBay sets a restriction limiting the eBay advertisement to be combined only with video clips related to Seinfeld. The application server 414 confirms that combining the Seinfeld clip and the eBay advertisement does not violate the restrictions associated with either the clip or the advertisement, then joins the advertisement and the clip into a combined clip, such that the eBay advertisement leads into the Seinfeld clip. Subsequently, the community website 610 generates a webpage including a pointer reference to the combined clip, and redirects the second user 640 to the generated webpage, where the second user 640 downloads the combined clip.

After the combined clip is downloaded in the second user 640's computer, the computer plays the eBay advertisement and the Seinfeld clip to the second user 640. The payment server 416 calculates an advertisement fee for the advertiser eBay and deducts the fee from its account. The payment server 416 also calculates a royally payment for the content owner, Sony Pictures Digital Inc., and credits the payment to its account.

Summary

Embodiments of the invention can provide a web portal for users to share and exchange media contents, while grant content owners rights to control the use of their media content. Operator of the web portal can generate advertising revenue by distributing advertisements together with media contents to the users, and share the revenue with the content owners to compensate them for their permissions to provide their media content to the users.

Any of the steps, operations, or processes described herein can be performed or implemented with one or more hardware or software modules, alone or in combination with other devices. In one embodiment, a software module is implemented with a computer program product comprising a computer-readable medium containing computer program code, which can be executed by a computer processor for performing any or all of the steps operations, or processes described. For example, the physical components used in the system may depend on the method in which the media content is delivered to one or more users of that media content.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

Finally, it should be noted that the language used in the specification has been principally selected for readability and instructional purposes, and may not have been selected to delineate or circumscribe the inventive subject matter. Accordingly, the disclosure of the invention is intended to be illustrative, but not limiting, of the scope of the invention, which is set forth in the following claims.

What is claimed is:

1. A computer-implemented method for sharing media content from a first device over a digital network, the method comprising:
   receiving a media stream at the first device from a remotely-located media source;
   receiving information that describes the content of the media stream at the first device;
   receiving user commands that define a portion of the received media stream bounded by a start point and an end point, wherein the start point and the end point of the defined portion are each defined by the user;
   responsive to receiving the user commands, capturing the defined portion of the received media stream that is bounded by the user defined start point and the user defined end point to thereby create a clip of the defined portion of the media stream;
   automatically associating at least some of the information that describes the media stream with the clip that was captured from the media stream; and
   transmitting the clip and the associated information that describes the media stream to a second device via the digital network to thereby allow the second device to identify the media stream from which the clip was captured.

2. The method of claim 1 wherein the information that describes the content of the media stream comprises metadata associated with the received media stream that defines a limited duration for clips created from particular programming contained within the received media stream.

3. The method of claim 1 wherein the information that describes the content of the media stream is received with the media stream from the remote source.

4. The method of claim 2 further comprising preventing the clip from exceeding the limited duration defined in the metadata for the particular programming contained within the media stream.

5. The method of claim 1 wherein the information that describes the media stream allows the first device to limit a duration of the clip based upon the content of the media stream.

6. The method of claim 1 wherein the information that describes the media stream associated with the clip allows the second device to limit distribution of the clip based upon access rights associated with the media stream from which the clip was captured.

7. The method of claim 1 wherein the first device restricts the capturing of the defined portion based upon the information that describes the media stream.

8. The method of claim 1, wherein the information that describes the media stream is received at least in part from an automatic process for obtaining information about the media stream.

9. The method of claim 1, wherein the information that describes the media stream is received at least in part by automatically extracting metadata embedded in the media stream.

10. The method of claim 1, wherein the information that describes the media stream is automatically obtained at least in part from electronic programming guide data received from the remotely-located media source.

11. The method of claim 1, wherein the transmitting of the clip comprises uploading the clip to a media content sharing website that is configured to limit distribution of the clip based upon the associated information about the media stream from which the clip was captured.

12. The method of claim 1 further comprising caching at least a portion of the received media stream at the first device and playing the media stream from the cached portion of the media stream, and wherein the captured portion of the media stream used to create the clip is obtained from the same cached portion of the media stream used to play the media stream.

13. A client device for sharing media content client device being configured for performing a method comprising:
- receiving a media stream at the client device from a remotely-located media source;
- receiving information that describes the content of the media stream at the client device;
- receiving user commands at the client device that define a portion of the received media stream, wherein the portion of the media stream is bounded by a start point and an end point that are each defined by the user;
- responsive to receiving the user commands, capturing the defined portion of the received media stream that is bounded by the start point and the end point defined by the user to thereby create a clip of the defined portion of the received media stream;
- automatically associating at least some of the information that describes the media stream with the clip that was captured from the media stream; and
- transmitting the clip of the defined portion of the received media stream and the associated information to a second device via the digital network to thereby allow the second device to identify the media stream from which the clip was captured.

14. The client device of claim 13 wherein the media stream is a digital media stream transmitted over the digital network to the client device from a placeshifting device that is configured to receive a television signal from a source, to convert the television signal to the media stream, and to transmit the media stream on the digital network.

15. The client device of claim 14 wherein the information that describes the content of the media stream is electronic program guide information about the content of the television signal, and wherein the electronic program guide information is received at the client device from a network service apart from the placeshifting device that transmits the digital media stream to the client device.

16. A media device comprising:
- an interface to a digital network;
- a cache configured to temporarily store at least a portion of a media stream as the media stream is received from a remotely-located media source; and
- a processor configured to receive information that describes the content of the media stream, to output the cached portion of the media stream for presentation on a display as the media stream is received, to receive user commands that define a start point and an end point of a user-defined portion of the received media stream while the cached portion of the media stream is being output for presentation, to create a clip of the defined portion of the media stream by copying data from the cached portion of the media stream, to automatically associate at least some of the information that describes the content of the media stream with the created clip, and to transmit the created clip and the associated information to a second device via the digital network to thereby allow the second device to identify the media stream from which the clip was created.

17. The media device of claim 16 wherein the media stream is received via the interface to the digital network from a remotely-located placeshifting device.

18. The media device of claim 17 wherein the information that describes the content of the media stream is electronic program guide information about the content of the television signal, and wherein the electronic program guide information is received at the client device from a network service apart from the remotely-located placeshifting device that transmits the digital media stream to the client device.

19. The media device of claim 16 wherein the processor is further configured to restrict a length of the defined portion based upon the information that describes the media stream.

* * * * *